US009679030B2

(12) United States Patent
Hatami-Hanza

(10) Patent No.: US 9,679,030 B2
(45) Date of Patent: Jun. 13, 2017

(54) ONTOLOGICAL SUBJECTS OF A UNIVERSE AND KNOWLEDGE PROCESSING THEREOF

(71) Applicant: Hamid Hatami-Hanza, Thornhill (CA)

(72) Inventor: Hamid Hatami-Hanza, Thornhill (CA)

(73) Assignee: Hamid Hatami-Hanza, Thornhill, Ontario (CA)

( * ) Notice: Subject to any disclaimer, the term of this patent is extended or adjusted under 35 U.S.C. 154(b) by 0 days.

(21) Appl. No.: 14/616,687

(22) Filed: Feb. 7, 2015

(65) Prior Publication Data
US 2015/0169746 A1    Jun. 18, 2015

Related U.S. Application Data

(60) Continuation of application No. 13/789,635, filed on Mar. 7, 2013, now Pat. No. 8,983,897, which is a
(Continued)

(51) Int. Cl.
*G06F 17/30* (2006.01)
*G06N 5/02* (2006.01)

(52) U.S. Cl.
CPC .. *G06F 17/30557* (2013.01); *G06F 17/30312* (2013.01); *G06F 17/30713* (2013.01); *G06F 17/30734* (2013.01); *G06N 5/022* (2013.01)

(58) Field of Classification Search
CPC ......... G06F 17/30557; G06F 17/30734; G06F 17/30312; G06F 17/30713; G06N 5/022
(Continued)

(56) References Cited

U.S. PATENT DOCUMENTS 5,845,049 A * 12/1998 Wu .................. G06F 19/24
                                                    706/16
6,493,761 B1 * 12/2002 Baker .............. H04L 29/06
                                                    370/401
(Continued)

OTHER PUBLICATIONS

Castells et al Article:"An Adaptation of the Vector—Space Model for Ontology-Based Information Retrieval", 2007, Knowledge and Data Engineering, IEEE Transactions on (vol. 19 , Issue: 2 ), pp. 261-272, ISSN :1041-4347 INSPEC Accession No. 9317010 DOI: 10.1109/TKDE.2007.22.*
(Continued)

*Primary Examiner* — Evan Aspinwall

(57) ABSTRACT

The present invention discloses methods, systems, and tools for knowledge processing by building various data structures corresponding to uncovered informational data such as values of association strengths or significance measures and maps of ontological subjects of compositions or one or more content accompanying a request for service by a user. In one embodiment of the invention the method assigns and calculates an ontological subject association strength/value measures and spectrums to each composition or ontological subject. The resulting data, spectrums, and the adjacency matrix of the map are used to evaluate the merits of the compositions in the context of reference universes. It is also used as a research guiding tool for knowledge discovery or automatically generating high value compositions or new or less known knowledge about the ontological subjects of the universe. The invention serves knowledge seekers, knowledge creators, intelligent machines or robots, inventors, discoverer, as well as general public by assisting and guiding users to assess their work, identify their unknowns, optimize their research trajectory, and provide higher quality content. The method and system, thereby, is instrumental in increasing the speed and efficiency of knowledge acquisition,
(Continued)

machine learnings, autonomous decision making, navigations, discovery, retrieval, as well as faster learning and problem solving.

9 Claims, 21 Drawing Sheets

Related U.S. Application Data continuation of application No. 12/179,363, filed on Jul. 24, 2008, now abandoned, and a continuation of application No. 13/740,228, filed on Jan. 13, 2013, now Pat. No. 9,183,505, and a continuation of application No. 14/151,022, filed on Jan. 9, 2014, now Pat. No. 9,613,138, and a continuation of application No. 14/274,731, filed on May 11, 2014, now abandoned, and a continuation of application No. 14/018,102, filed on Sep. 4, 2013, now abandoned, and a continuation of application No. 12/908,856, filed on Oct. 20, 2010, now abandoned, and a continuation of application No. 13/608,333, filed on Sep. 10, 2012, now Pat. No. 9,070,087, said application No. 13/789,635 is a division of application No. 12/547,879, filed on Aug. 26, 2009, now Pat. No. 8,452,725, said application No. 13/740,228 is a division of application No. 12/939,112, filed on Nov. 3, 2010, now Pat. No. 8,401,980, said application No. 14/151,022 is a division of application No. 12/755,415, filed on Apr. 7, 2010, now Pat. No. 8,612,445, said application No. 14/274,731 is a continuation of application No. 12/955,496, filed on Nov. 29, 2010, now Pat. No. 8,775,365, said application No. 14/018,102 is a division of application No. 12/946,838, filed on Nov. 15, 2010, now Pat. No. 8,560,599.

(60) Provisional application No. 61/093,952, filed on Sep. 3, 2008, provisional application No. 61/259,640, filed on Nov. 10, 2009, provisional application No. 61/177,696, filed on May 13, 2009, provisional application No. 61/311,368, filed on Mar. 7, 2010, provisional application No. 61/263,685, filed on Nov. 23, 2009, provisional application No. 61/253,511, filed on Oct. 21, 2009, provisional application No. 61/546,054, filed on Oct. 11, 2011.

(58) Field of Classification Search
USPC .......................................................... 707/603
See application file for complete search history.

(56) References Cited

U.S. PATENT DOCUMENTS

| | | | |
|---|---|---|---|
| 6,847,966 B1* | 1/2005 | Sommer | G06F 17/3069 704/1 |
| 2007/0016863 A1* | 1/2007 | Qu | G06F 17/30731 715/702 |
| 2009/0063134 A1* | 3/2009 | Gallagher | G06F 17/27 704/10 |

OTHER PUBLICATIONS

Castells et al (NPL: "An Adaptation of the Vector—Space Model for Ontology-Based Information Retrieval", 2007).*

* cited by examiner

ONTOLOGICAL SUBJECTS OF A UNIVERSE AND KNOWLEDGE PROCESSING THEREOF

CROSS-REFERENCED TO RELATED APPLICATIONS

The present application is a continuation-in-part of and claims the benefits of:
1. The U.S. patent application Ser. No. 13/789,635, filed on Mar. 7, 2013, entitled "SYSTEM AND METHOD OF ONTOLOGICAL SUBJECT MAPPING FOR KNOWLEDGE PROCESSING APPLICATIONS" which is a divisional of and claims the benefit of the U.S. patent application Ser. No. 12/547,879 filed on Aug. 26, 2009, now U.S. Pat. No. 8,452,725, entitled the same, which claims priority from the U.S. provisional patent application No. 61/093,952 filed on Sep. 3, 2008, entitled the same; and
2. the US patent application Ser. No. 14/151.022 filed on Jan. 9, 2014 entitled "UNIFIED SEMANTIC SCORING OF COMPOSITIONS OF ONTOLOGICAL SUBJECTS", which is a continuation-in-part of and claim the benefits of U.S. patent application Ser. No. 13/962,895, filed on Aug. 8, 2013, now U.S. Pat. No. 8,793,253, entitled "UNIFIED SEMANTIC RANKING OF COMPOSITIONS OF ONTOLOGICAL SUBJECTS" which is a divisional of and claims the benefits of the U.S. patent application Ser. No. 12/755,415, now U.S. Pat. No. 8,612,445, filed on Apr. 7, 2010, entitled "SYSTEM AND METHOD FOR A UNIFIED SEMANTIC RANKING OF COMPOSITIONS OF ONTOLOGICAL SUBJECTS AND THE APPLICATIONS THEREOF", which claims priority from U.S. provisional patent application No. 61/177,696 filed on May 13, 2009 entitled: "SYSTEM AND METHOD FOR A UNIFIED SEMANTIC RANKING OF COMPOSITIONS OF ONTOLOGICAL SUBJECTS AND THE APPLICATIONS THEREOF"; and
3. the U.S. patent application Ser. No. 13/740,228, filed on Jan. 13, 2013, entitled "SYSTEM AND METHOD FOR VALUE SIGNIFICANCE EVALUATION OF ONTOLOGICAL SUBJECTS OF NETWORKS AND THE APPLICATION THEREOF" which is a divisional of and claims the benefits of the U.S. patent application Ser. No. 12/939,112, filed on Nov. 3, 2010, now U.S. Pat. No. 8,401,980, entitled "METHODS FOR DETERMINING CONTEXT OF COMPOSITIONS OF ONTOLOGICAL SUBJECTS AND THE APPLICATIONS THEREOF USING VALUE SIGNIFICANCE MEASURES (VSMS), CO-OCCURANCES AND FREQUENCY OF OCCURANCES OF THE ONTOLOGICAL SUBJECTS SYSTEM", which claims priority from U.S. provisional application No. 61/259,640 filed on Nov. 10, 2009, entitled "SYSTEM AND METHOD FOR VALUE SIGNIFICANCE EVALUATION OF ONTOLOGICAL SUBJECTS OF NETWORKS AND THE APPLICATION THEREOF"; and
4. The U.S. patent application Ser. No. 14/274,731, filed on May 11, 2014 entitled INTERACTIVE AND SOCIAL KNOWLEDGE DISCOVERY SESSIONS" which is a continuation of and claims the benefit of U.S. patent application Ser. No. 12/955,496, filed on Nov. 29, 2010, now U.S. Pat. No. 8,775,365 entitled "INTERACTIVE AND SOCIAL KNOWLEDGE DISCOVERY SESSIONS" which claims priority from U.S. provisional patent application No. 61/311,368 filed on Mar. 7, 2010, entitled "Interactive and Social Knowledge Discovery Sessions"; and
5. the U.S. patent application Ser. No. 14/018,102, filed on Sep. 4, 2013, entitled "AUTOMATIC CONTENT COMPOSITION GENERATION, which is a divisional of and claims the benefits of the U.S. patent application Ser. No. 12/946,838, now U.S. Pat. No. 8,560,599 B2, filed on Nov. 15, 2010 entitled the same, which claims priority from U.S. provisional application No. 61/263,685 filed on Nov. 23, 2009, entitled the same; and
6. the U.S. patent application Ser. No. 12/908,856 entitled "SYSTEM AND METHOD OF CONTENT GENERATION", filed on Oct. 20, 2010, which claims priority from U.S. provisional application No. 61/253,511 filed on Oct. 21, 2009, entitled the same; and
7. the U.S. patent application Ser. No. 13/608,333 filed on Sep. 10, 2012, entitled "METHODS AND SYSTEMS FOR INVESTIGATION OF COMPOSITIONS OF ONTOLOGICAL SUBJECTS" which claims priority from U.S. provisional application No. 61/546,054 filed on Oct. 11, 2011 entitled the same; and
8. the U.S. patent application Ser. No. 12/179,363 entitled "ASSISTED KNOWLEDGE DISCOVERY AND PUBLICATION SYSTEM AND METHOD", filed on Jul. 24-2008, which claims priority from Canadian Patent Application Ser. No. CA 2,595,541, filed on Jul. 26, 2007, entitled the same; and which are all herein incorporated by reference in their entirety for all purposes.

FIELD OF INVENTION

This invention generally relates to information processing, knowledge processing and discovery, knowledge retrieval, artificial intelligence, machine learning, ontology organization and applications.

BACKGROUND OF THE INVENTION

Current methods of research, learning, training, and knowledge discovery utilizing informational retrieval systems and search engines or large data set analysis are not very efficient. They are very time consuming and often requires that a user poses lots of expertise and previous knowledge and background to effectively use the information given by the informational retrieval systems or other large data analytical tools about the user's subject matter of interest.

SUMMARY OF THE INVENTION

Currently, knowledge acquisition, retrieval, learning, training, and discovery very much depend on the skill, depth and breadth of a researcher's knowledge. The problem that often slows down the knowledge acquisition and discovery is lack of awareness of unknowns. For example, when we want to do research in a subject or a topic, we usually use search engines to collect all the related data and often we overwhelmed with the number and extent of the documents found related to that subject. One should diligently read and analyze so many documents to find out that in order to master the subject/topic she/he should have known other subjects/topics first. Or find out after a long a period of time that in the process of understanding, analyzing and coming up with a solution, or a useful idea, related to a challenging problem, she/he has missed or overlooked many other important subjects. Therefore, it is important, desirable, and valuable to know and sort the most important things to know related to a subject and present to a user or machine.

It is also very desirable to enable a data processing system, such as a computer system comprise of data processing or computing devices/units, data storage units/devices, and/or environmental data acquisitions units/devices, and/or data communication units/devices, and/or input/output units/devices, and/or limbs, to learn as much information and gain knowledge/data by processing compositions of data of various forms and/or become able to produce new knowledge and useful data or compositions of data and/or autonomous decision making according to some codes of conducts. Such an enabled machine would be of an immense assistance to the development of human civilization much further and much faster leading to abundance, economic prosperity, biological and mental health, and well-being of society.

Accordingly and, for instances, in applications such as question answering, knowledge retrieval, or machine learning from a knowledge database or knowledge repositories or data warehouses or streams, one need to know what are there to know at first and then looking for how they are related in order to build and enrich the knowledge base that is able to serve a client satisfactorily. Currently, for instance, there is no systematic way of building such a database or general ontology consisting of statements of verified facts. The few attempts to build such useful databases are based on human labor or complicated reasoning and first order logic framework, rather than a systematic and automatic way of finding the distilled knowledge from the vast repositories of human generated data available over the internet or other data warehouses.

Also in applications such as new knowledge discovery, education, essay examination, self-education, scientific paper evaluation, machine learning, neural networks deep learning and training, pattern recognition, intelligent conversation, composing new knowledge and content, business proposal evaluations, and many others it would be very helpful and desirable if we can measure aspectual importance and/or intrinsic value of a composition in the universal context or in comparison with a large repository of knowledge. So that one can make sure that a composition is sound or the knowledge therein is genuinely valuable and original. Especially in publishing user generated content it is important to check the substance and merit of submitted content before being published or sending through the costly process of expert reviewing.

All the above and many more arguments indicate a need in the art of knowledge discovery, knowledge retrieval, machine learning, pattern recognition, feature extraction, knowledge publishing, and the like, for a reference metadata repository and/or a map about knowledge-bearer-components that is easy to use by machines or by man to navigate based on their intrinsic and/or at least one aspect of importance in the context of our universe or universe of a composition or a body of knowledge. Moreover, there is a need for such additional data and information or maps for ranking and measuring the merit of newly composed documents or electronic contents and/or ranking existing compositions for more relevant retrieval, knowledge navigation, recognition of patterns and trends, feature extraction and visual identifications, encryption, composition generation, exploration, and generally assisting users in their research to gain speed and efficient.

In this disclosure association strengths between ontological subjects (e.g. strings of symbols such as natural language texts or collections of documents, pictures, multimedia content, visual content comprise of pixels, DNA codes and strings, frames or various codes binary or otherwise etc. please see the definition section of the detailed description part of this disclosure) of a composition and various association strengths measures are defined and calculated for various applications.

Values of different association strength measures are placed in one or more data structures which can be representative of data arrays corresponding to vectors or matrix for convenience of calculations by data processing devices/units. The data processing devices to carry out the calculations, storing, and data transportation between the various part of one or more computer systems can be selected from such technologies such as electronic or optical based processors, semiconductor based or quantum computers, application specific processing devices and the like. Different embodiments are given for ease of calculations, obtaining, building and processing the data of said one or more data structures or vectors or matrices than can be implement with computer systems of predesigned processing speeds and/or storage media access speed and capacities such as certain RAM capacity, SSD, HD, and/or optical memories and the like with required access time.

The association strength values further can be represented as an association spectrum for an ontological subject. In this way an ontological subject is also represented by a spectrum of its associations according to at least one association strength measure.

Therefore an ontological subjects of a composition is not only represented by a string of characters but also there would be additional vast information available for the ontological subject corresponding to its type/s of relationship with other ontological subjects of the composition. Said additional information or data is learnt, through implementing the methods of current disclosure and the incorporated references herein, from the ways these ontological subjects being used or composed together to make up a composition or more generally to form a body of knowledge.

In this way the implicit information not recognizable, useable, or appreciable by a human (due to inherent biological limitations) can be extracted, stored and become useable by a data processing system or machine. Said data processing system or machine therefore will become able to use its superior processing speed and unmatched, by human, memory capacity or environmental data acquisition capabilities, to perform intelligent tasks. Examples of such intelligent tasks could be, but of course not limited to, conversing intelligently or evaluating a merit of a composition, recognizing visual objects, or composing an essay or a multimedia content, decision making, automatic knowledge discovery, controlling physical action/reaction of a machine to its limbs, management of tasks and sessions, and in general such tasks that currently can only be done by human being.

Accordingly various association strength measures are defined and methods and systems are given to measure and calculate these measures from the data of a body of knowledge or data.

For examples, In U.S. patent application Ser. No. 12/939,112, filed on Nov. 3, 2010, now U.S. Pat. No. 8,401,980, as well as in the U.S. patent application Ser. No. 13/608,333 filed on Sep. 10, 2012, direct association, straight associations, novel associations, relational association, relational novel association, and many more measures have been defined and introduced along with methods of evaluating them which are incorporated all as references in this application and (as also given in the other incorporated references herein)

In particular in this application indirect association strength measure are defined and the method of calculating such a measure is given. This disclosure shows how new association strength measure can be used instrumentally to accelerate the rate of knowledge discovery by discovering and identifying the ontological subjects showing strong indirect associations but small or little known direct association. Accordingly, association strength measures and the way of their calculations are presented to make a system become able to identify strongly related OSs which show little direct straight associations calculated from the data of the Body of Knowledge.

Accordingly, in one embodiment indirect association strength are calculated in which the OSs are not explicitly expressed by the composition as being related to each other but in fact they can be related inherently or metaphorically to each other once their association to other ontological subjects are looked at more closely. Therefore in this way the system or machine can produce lots of unknown questions to ask and solicit content and comments or to start a discussion or brainstorming, or to decide to generate a signal or an order to find the real underlying relations between the ontological subjects shown strong indirect association strengths. Consequently the system of accompanying in this disclosure can pose substantial questions and topics for knowledge discovery and research or providing new perspectives, new advice, automatic research, novel new compositions, and/or making jokes etc.

The values of different association measures showing association strengths of other ontological subjects of a composition to one or more ontological subjects of the composition mathematically are shown by vectors or matrices. The association vectors showing association strength (according to at least one of the association strength measures) of other ontological subjects of the composition to a particular ontological subjects. Said vectors (e.g. rows or columns of a matrix having entries corresponding to an association strength measure) are also considered as association spectrums for the ontological subject. Consequently different association strength spectrums are defined for one or more Ontological subjects of the body of knowledge from which many other measure can be calculated.

Having defined calculated, and built data structures of the different association spectrums for an ontological subjects then the disclosure (along with the incorporated references herein) introduces methods for obtaining information or data about many other relationships between different ontological subjects of the composition. Said data or information then is used for various computer system or electronic implementations of various applications and services.

Moreover the resultant various association spectrums are very instrumental and can be employed in new services and products, or other learning approaches such as neural networks and automatic machine deep learnings and inferences, by processing the data of the association strengths.

In this disclosure the information or knowledge-bearer-components are called Ontological Subjects (OS) and also disclosed in the present invention are systems and methods of building ontological subject maps (OSMs) of a composition using the data of association strength values of different measures of association strength. The system and method is instrumental for applications in ranking, merit evaluation of compositions, machine learning, deep learning, decision making, man-machine or machine to machine conversation, knowledge retrieval, knowledge exploration, research trajectory guiding, knowledge visualization, contribution measurement of new composition, and novelty detection as well as many other applications such as summarization, automatic report generation, question answering, and the like. The Ontological Subject Maps (OSM) are build using a plurality of ontological subjects by building the co-occurrence matrix and estimating association value/strengths according to different types of measures of associations of each two ontological subjects, and/or their value significances, that have participated in one or more compositions or the parts thereof. Moreover, again the resultant various association spectrums are very instrumental and employed in new services and products by processing the data of the association strengths.

For each or any collection of compositions a universe, containing ontological subjects, is defined that the composition is trying to describe. According to one embodiment of the invention, the intrinsic importance of each ontological subject in the context of its universe is then calculated by defining a power value function for each ontological subject. The OSM can be build for single composition or for the entire repository of human knowledge such as the whole content of internet. The OSM and power spectrum of corresponding ontological subject build from the universe of the composition can be compared to a reference OSM build from a larger universe in order to assign a rank or merit for a composition for variety of applications mentioned above. Different exemplary metrics for comparison and merit valuation is proposed and introduced that are indicatives of intrinsic value of a composition such as authoritativeness, novelty, and substance. When the reference OSM is derived from a much larger repository or collection of repositories or the whole internet content, the calculated power of the ontological subjects are then universal. The power of OSs is, therefore, an indication of their intrinsic rule or importance in the real universe based on the comprehension of human beings since the start of civilization. Consequently ranking or assigning a weigh for each composition, based on its OS spectrum, is also universal.

In another embodiment, the reference OSM is proposed to be used for knowledge navigation and research trajectory identification. Since the map, when derived from large enough repositories, is basically map of human knowledge, a system and method is provided to guide a user to achieve her/his research goal much more efficiently and faster than using current search engine and knowledge navigation methods.

In yet another embodiment and application of the invention, the OSM is used to select a desirable number of OSs of interest and by way of searching and statistics to find the verified statements of the facts about that OS from a corpus or a collection of compositions related to that OS. Moreover for each two or more associated OS, it looks for explicitly expressed relations between those OSs and statistically verifies the specifics of their relationship and index the verified relationship in a knowledge database in the form of true statements containing two or more OSs. Thereby building a universal ontology becomes more automatic and efficient. The universal ontology has many important applications such as question answering and automatic useful knowledge discovery by reasoning and first order logic.

BRIEF DESCRIPTION OF THE DRAWINGS

FIG. 1a, shows the internet as one composition (the largest) trying to describe our universe, and FIG. 1b, shows that any other composition can also be viewed as an attempt to describe a smaller universe, i.e. its own universe.

DETAILED DESCRIPTION

Figure 1A:
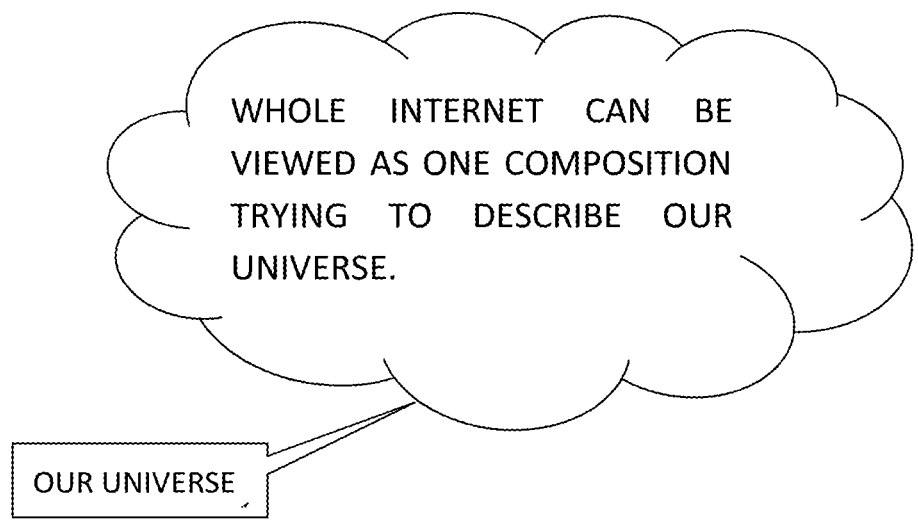
FIGS. 1a and 1b: illustrate the concept of viewing compositions as attempts to describe their universes.

Definitions:
1. Ontological Subject: symbol or signal referring to a thing (tangible or otherwise) worthy of knowing about. Therefore Ontological Subject means generally any string of characters, but more specifically, characters, letters, numbers, words, binary codes, bits, mathematical functions, sound signal tracks, video signal tracks, electrical signals, chemical molecules such as DNAs, and their parts, or any combinations of them, and more specifically all such string combinations that indicates or refer to an entity, concept, quantity, and the incidences of such entities, concepts, and quantities. In this disclosure Ontological Subject/s and the abbreviation OS or OSs are used interchangeably.
2. Ordered Ontological subjects: Ontological Subjects can be divided into sets with different orders depends on their length, attribute, and function. Basically the order is assigned to a group or set of ontological subjects having at least one common predefined attribute, property, or characteristic. Usually the orders in this disclosure are denoted with alpha numerical characters such as 0, 1, 2, etc or OS1, OS2, etc. or any other combination of characters so as to distinguish one group or set of ontological subjects, having at least one common predefined characteristic, with another set or group of ontological subjects having another at least one common characteristic. This order/s will also be reflected in denoting/corresponding the data objects or the mathematical objects in the formulations to distinguish these data objects in relation to their corresponding ontological subject set or its order, as will be used and introduced throughout this disclosure. For instance, for ontological subjects of textual nature, one may characterizes or label letters as zeroth order OS, words or multiple word phrases as the first order, sentences or multiple word phrases as the second order, paragraphs as the third order, pages or chapters as the fourth order, documents as the fifth order, corpuses as the sixth order OS and so on. As seen the order can be assigned to a group or set of ontological subjects based on at least one common predefined characteristic of the members of the set. So a higher order OS is a combination of, or a set of, lower order OSs or lower order OSs are members of a higher order OS. Equally one can order the genetic codes in different orders of ontological subjects. For instance, the 4 basis of a DNA molecules as the zeroth order OS, the base pairs as the first order, sets of pieces of DNA as the second order, genes as the third order, chromosomes as the fourth order, genomes as the fifth order, sets of similar genomes as the sixth order, sets of sets of genomes as the seventh order and so on. Yet the same can be defined for information bearing signals such as analogue and digital signals representing audio or video information. For instance for digital signals representing a signal, bits (electrical One and Zero) can be defined as zeroth order OS, the bytes as first order, any sets of bytes as third order, and sets of sets of bytes, e.g. a frame, as fourth order OS and so on. Yet in another instance for a picture or a video frame, the pixels with different color can be regarded as first order OS, a set whose members contain two or more number of pixels (e.g. a segment of a picture) can be regarded as OSs of second order, a set whose members contain of two or more such segments as third order OS, a whole frame as forth order OS, and a number of frames (like a certain period of duration of a movie such as a clip) as fifth order and so on. Therefore definitions of orders for ontological subjects are arbitrary set of initial definitions that one can stick to in order to make sense of the methods and mathematical formulations presented herein and being able to interpret the consequent results or outcomes in more sensible and familiar language."

More importantly Ontological Subjects can be stored, processed, manipulated, and transported by transferring, transforming, and using matter or energy (equivalent to matter) and hence the OS processing is an instance of physical transformation of materials and energy.

3. Composition: is an OS composed of constituent ontological subjects of lower or the same order, particularly text documents written in natural language documents, genetic codes, encryption codes, data files, voice files, video files, and any mixture thereof. In other words ontological subjects are used or employed to make up a composition. A collection, or a set, of compositions is also a composition. Therefore a composition is in fact an Ontological Subject of particular order which can be broken to lower order constituent Ontological Subjects. In this disclosure, the preferred exemplary composition is a set of data containing ontological subjects, for example a webpage, papers, documents, books, a set of webpages, sets of PDF articles, one or more string of genetic codes, one or more genomic data files, an stream of data binary or otherwise, multimedia files, or even simply words and phrases. Moreover, compositions and bodies of knowledge are basically the same and are used interchangeably in this disclosure. Compositions are distinctly defined here for assisting the description in more familiar language than a technical language using only the defined OSs notations.

4. Partitions of composition: a partition of a composition, in general, is a part or whole, i.e. a subset, of a composition or collection of compositions. Therefore, a partition is also an Ontological Subject having the same or lower order than the composition as an OS. More specifically in the case of textual compositions, parts or partitions of a composition can be chosen to be characters, words, sentences, paragraphs, chapters, webpage, documents, etc. A partition of a composition is also any string of symbols representing any form of information bearing signals such as audio or videos, texts, DNA molecules, genetic letters, genes, and any combinations thereof. However one preferred exemplary definition of a partition of a composition in this disclosure is word, sentence, paragraph, page, chapters, documents, sets of documents, and the like, or WebPages, and partitions of a collection of compositions can moreover include one or more of the individual compositions. Partitions are also distinctly defined here for assisting the description in more familiar language than a technical language using only the general OSs definitions.

5. Significance Measure: assigning a quantity, or a number or feature or a metric for an OS from a set of OSs so as to assist to distinguishing or selecting one or more of the OSs from the set. More conveniently and in most cases the significance measure is a type of numerical quantity assigned to a partition of a composition. Therefore significance measures are functions of OSs and one or more of other related mathematical objects, wherein a mathematical object can, for instance, be a mathematical object containing information of participations of OSs in each other, whose values are used in the decisions about the constituent OSs of a composition. For instance, "Relational, and/or associational, and/or novel significances" are one form or a type of the general "significance measures" concept and are defined according to one or more the aspect of interest and/or in relation to one or more OSs of the composition (sometimes it is called importance factors as well in this application and some of the incorporated references).

6. Filtration/Summarization: is a process of selecting one or more OS from one or more sets of OSs according to predetermined criteria with or without the help of value significance and ranking metric/s. The selection or filtering of one or more OS from a set of OSs is usually done for the purposes of representation of a body of data by a summary as an indicative of that body in respect to one or more aspect of interest. Specifically, therefore, in this disclosure searching through a set of partitions or compositions, and showing the search results according to the predetermined criteria is considered a form of filtration/summarization. In this view finding an answer to a query, e.g. question answering, or finding a composition related or similar to an input composition etc. is also a form of searching through a set of partitions and therefore are a form of summarization or filtration according to the given definitions here.

7. The usage of quotation marks " ": throughout the disclosure several compound names of concepts, variable, functions and mathematical objects and their abbreviations (such as "participation matrix", or PM for short, "Co-Occurrence Matrix", or COM for short, "value significance measure", or VSM for short, and the like) will be introduced, either in singular or plural forms, that once or more is being placed between the quotation marks (" ") for identifying them as one object (or a regular expression that is used in this disclosure frequently) and must not be interpreted as being a direct quote from the literatures outside this disclosure."

8. UNIVERSES OF COMPOSTIONS: Universe: in this disclosure "universe" is frequently used and have few intended interpretation: when "universe x" (x is a number or letter or word or combination thereof) is used it mean the universe of one or more compositions, that is called x, and contains none, one or more ontological subjects. By "real universe" or "our universe" we mean our real life universe including everything in it (physical and its notions and/or so called abstract and its notions) which is the largest universe intended and exist. Furthermore, "universal" refers to the real universe.

Furthermore, in the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

1. Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "for instance", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

2. Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present embodiments may take the form of a computer program product embodied in any tangible medium of expression having computer-usable program code embodied in the medium.

3. Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present embodiments may be written in any combination of one or more programming languages.

4. Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

5. The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

6. As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

7. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

8. Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

Now the invention is disclosed in details in reference to the accompanying Figures and exemplary cases and embodiments in the following subsections.

II-Description

All the electronic contents are compositions of a number of ontological subjects that are used or employed to describe a universe. The quality of composition's content in terms of its substance, validity, usefulness or beauty lies in the way that the content has been composed. While the number of possible compositions is endless, real life ontological subjects, however, are limited. All the compositions are talking about some of the ontological subjects of our universe. However, the real universe itself is one subject that has been functioning consistently for a long time. Therefore the underlying knowledge describing the working mechanism of our universe should be one well composed, e.g. written, composition that we as human are trying to uncover. Consequently the description of such system including all that there is in it and all the details should be straightforward once the relations between the parts become verifiably well known.

Our universe consists of parts, big and small, and whereas some parts of the universe are more important than the others. In describing our universe we usually can only focus on very small parts of it. However, focusing only on a small part of our universe can be misleading if the corresponding expressive statements don't get verified in the context of larger parts of the real universe. Therefore it is always more useful and more valuable to assess a composition, e.g. document, in larger context than a specific context or specific domain of discourse.

In this invention we view each composition as a document that is trying to describe a universe of its own. A composition therefore uses or employs ontological subjects to describe a universe. The universe of a composition could be a true part of our real universe and is considered true if matches to a part of a larger part of the real universe, or could be partly true if it is not a perfect match and sometimes could be totally wrong if does not match at all. For instance the description of a universe by a composition is done by showing and establishing relations between ontological subjects of that universe by natural languages. Similarly a picture or a visual content (also viewed as describing a universe by a composition of pixels of different colors) also shows a connection or relationship between different parts of a picture wherein different parts of the picture can refer to a something in the universe.

Accordingly, we define, for each composition, a universe that the composition is trying to describe by combining and relating the ontological subjects of the corresponding universe.

Figure 1B:
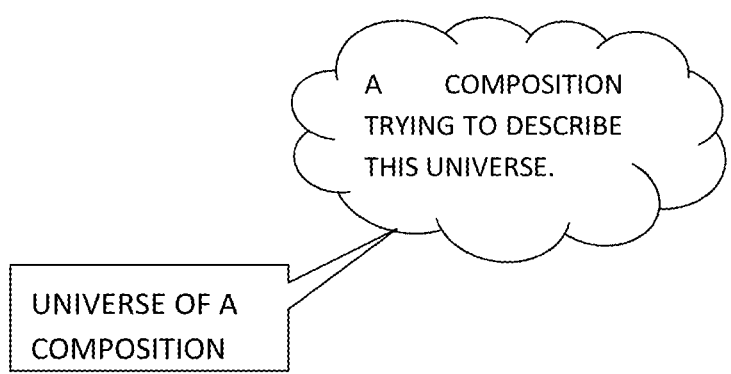

It can be argued that, currently, the largest repository of human knowledge is the internet. A collection of billions of documents each has tried to prove or establish a relation between some parts of the real universe. To illustrate the concept of the universe of a composition FIG. 1a, shows that the biggest human data repository, e.g. the internet, is trying to explain the universe around us whereas in FIG. 1b, illustrate a smaller composition which is trying to describe its own universe. The two universes might overlap in some parts and one universe maybe a subset of another universe as is the case in reality.

While it is difficult to become a master in any domain of discourse it becomes prohibitively difficult for human being to become a master in several domains of discourses. On the other hand more and more multidisciplinary expertise is required to discover important relations between the ontological subjects of different universes. Consequently it is important to know what are there to know in any universe and what is important to know firstly, secondly and so on. Hence whoever is trying to uncover some details of the real universe should be able to measure the importance and the value of his/her contribution in a much larger universal context. For instance, we have to have a way of distinguishing between a composition describing a valid and true breakthrough in cancer treatment from similar compositions claiming the same but in fact are partially valid and true. Furthermore, it is, for instance, important to know which discovery or invention is more important by how much and why. For example, discovery of new source of energy is more important than finding a solution for decreasing the production cost of a trivial specific product.

In a US patent application entitled "Assisted Knowledge Discovery And Publication System And Method", filed on Jul. 24, 2008, with the application number of Ser. No. 12/179,363 by the same applicant, (which is incorporated here entirely) an ontological subject mapping method and association value spectrums were disclosed wherein an Ontological Subject Map (OSM) and/or association value spectrums were used as a reference to assist in assessment of a submitted electronic content for considering for publication by an electronic publishing/broadcasting shop. In that application the preferred reference OSM and the OS association spectrums are the universal OSM that is aiming to map all the possible and existing ontological subjects (OSs). However, such a universal map can take a long time to construct.

In one embodiment of the present invention we use a universe of reference which could be smaller than the universe of whole internet yet yield satisfactory benefits of a universal OSM or association value spectrums. Accordingly we first introduce a method and system of building data structures of association value/strength spectrum or OSM for any exemplary universe of ontological subjects and then show the methods and systems of using such a data or maps for different applications.

The methods and systems that are devised here is to solve the proposed problem of investigating compositions of ontological subjects or making new compositions of ontological subjects through generating various data structures or data objects carrying new or more useful data values or information from the composition/s. Such data structures can constitute new foundations for machine learning, problem solving, intelligent behavior of a machine, and many more applications and services that some of them have been mentioned in the current disclosure or the incorporated references to this application. For example, in one or more embodiments of the current disclosure (with its incorporated references) different applications and services are introduced by defining and assigning various "association value/strength measures" or various "value significance measures" quantities to the constituent ontological subjects or partitions of a composition or a network of ontological subjects. It is further to disclose the methods of measuring the significance of the value/s so that the right "Value Significance Measure/s (VSM)", can be defined, synthesized, and be calculated for a desired aspect of investigation and be used for further processing of many related applications or other measures.

The methods and systems of the present invention and can be used for applications ranging from document classification, search engine document retrieval, news analysis, knowledge discovery, new knowledge creation, machine learning, autonomous decision making, discovery of new topics for discussion or research, sensible conversation between man a machine or machine to machine, research trajectory optimization, question answering, computer conversation, spell checking, summarization, categorizations, categorization, clustering, distillation, automatic composition generation, genetics and genomics, signal and image processing, to novel applications in economic systems by evaluating a value for business entities, crime investigation, financial applications such as financial decision making, credit checking, decision support systems, stock valuation, target advertising, and as well measuring the influence of a member in a social network, and/or any other problem that can be represented by graphs and for any group of entities with some kind of relations or association.

Although the methods are general with broad applications, implications, and implementation strategies and technique, the disclosure is described by way of specific exemplary embodiments to consequently describe the methods, implications, and applications in the simplest forms of embodiments and senses.

For instance it can be used as a system of knowledge discovery and publication systems as introduced in the U.S. patent application Ser. No. 12/179,363 entitled "Assisted Knowledge Discovery And Publication System And Method", filed on Jul. 24, 2008, which was incorporated as a reference."

In another instance it can be used as a system of interactive and social knowledge discovery with the help of a trained and taught intelligent knowledgeable system as introduced in the U.S. patent Ser. No. 12/955,496 now the U.S. Pat. No. 8,775,365 entitled "Interactive and Social Knowledge discovery Sessions" which was incorporated entirely as a reference in this application."

The system, for instance, can be used as a system of providing or generating visual and/or multimedia content as introduced the U.S. patent application Ser. No. 12/908,856 entitled "System And Method Of Content Generation", filed on Oct. 20, 2010, and or using the value significance measures and the maps and indexes to automatically generate content compositions as introduced in the U.S. patent application Ser. No. 12/946,838, filed on Nov. 15, 2010, now U.S. Pat. No. 8,560,599 B2 entitled: "Automatic Content Composition Generation", which were incorporated entirely as references in this application.

Also since most of human knowledge and daily information production is recorded in the form of text (or it can be converted or represented with textual/numerical characters) the detailed description might use textual compositions to illustrate the teachings and the methods and the systems. In what follows the invention is described in several sections and steps which in light of the previous definitions would be sufficient for those ordinary skilled in the art to comprehend and implement the methods, the systems and the applications thereof. In the following section we first set the mathematical foundation of the disclosed method from where we launch into introducing several "value significance measures" (VSMs) and ways of calculating them and their applications.

We explain the method/s and the algorithms with the step by step formulations that is easy to implement by those of ordinary skilled in the art and by employing computer programming languages and computer hardware systems that can be optimized or customized by build or design of hardware to perform the data processing or algorithm/s efficiently and produce useful outputs for various desired applications.

II-I Participation Matrix Building for a Composition

Assuming we have an input composition of ontological subjects, e.g. an input text, the "Participation Matrix" (PM) is a matrix (or data array/s or data structure/s) indicating the participation of one or more ontological subjects of particular order in one or more partitions of the composition. In other words in terms of our definitions, PM indicate the participation of one or more lower order OS into one or more OS of higher or the same order. PM/s are the most important array of data in this disclosure that contains the raw information from which many other important functions, information, features, and desirable parameters can be extracted. Without intending any limitation on the value of PM entries, in the exemplary embodiments throughout most of this disclosure (unless stated otherwise) the PM is a binary matrix having entries of one or zero and is built for a composition or a set of compositions as the following:

1. break the composition to desired numbers of partitions. For example, for a text document, break the documents into chapters, pages, paragraphs, lines, or any desired length or number of words and/or sentences, words etc. and assign an order number (e.g. 0, 1, 2, 3 . . . etc.) to any set of similar partitions, i.e. the ordered ontological subjects,
2. select a desired N number of OSs of order k and a desired M number of OSs of order l (these OSs are usually the partitions of the composition from the step 1) according to certain predetermined criteria, and;
3. construct a N×M matrix in which the ith raw ($R_i$) is a vector (e.g. a binary vector), with dimension M, indicating the presence of the ith OS of order k, (often extracted from the composition under investigation), in the OSs of order l, (often extracted from the composition under investigation or sometimes from another referenced composition), by having a nonzero value, and not present by having the value of zero.

We call this matrix the "Participation Matrix" of the order kl ($PM^{kl}$) which can be represented as:

$$PM^{kl} = \begin{array}{c} \\ OS_1^k \\ \vdots \\ OS_N^k \end{array} \overset{OS_1^l \ldots OS_M^l}{\begin{pmatrix} pm_{11}^{kl} & \ldots & pm_{1M}^{kl} \\ \vdots & \ddots & \vdots \\ pm_{N1}^{kl} & \ldots & pm_{NM}^{kl} \end{pmatrix}} \quad (1)$$

where $OS_p^k$ is the pth OS of the kth order (p=1 . . . N), $OS_q^l$ is the qth OS of the lth order (q=1 . . . M), usually extracted from the composition, and, according to one embodiment of this invention, $PM_{pq}^{kl}=1$ if $OS_p^k$ have participated, i.e. is a member, in the $OS_q^l$ and 0 otherwise. The desired criteria, in the step 2 above, can be, for instance, to only select the content words or select certain partitions having certain length or, in another instance, selecting all and every word or character strings and/or all the partitions.

The participating matrix of order lk, i.e. $PM^{lk}$, can also be defined which is simply the transpose of $PM^{kl}$ whose elements are given by:

$$PM_{pq}^{lk} = PM_{qp}^{kl} \quad (2).$$

Accordingly without limiting the scope of invention, the description is given by exemplary embodiments using the general participation matrix of the order kl, i.e the $PM^{kl}$ in which k≤l.

Furthermore PM carries much other useful information. For example using binary PMs, one can obtain a participation matrix in which the entries are the number of time that a particular OS (e.g. a word) is being repeated in another partitions of particular interest (e.g. in a document) one can readily do so by, for instance, the following:

$$PM\_R^{15}=PM^{12} \times PM^{25} \qquad (3)$$

wherein the $PM\_R^{15}$ stands for participation matrix of OSs of order 1 (e.g. words) into OSs of order 5 (e.g. the documents) in which the nonzero entries shows the number of time that a word has been appeared in that document (however the possible repetition of a word in an OS of order 2, e.g sentences, will not be accounted for here). Another applicable example is using PM data to obtain the "frequency of occurrences" of ontological subjects in a given composition by:

$$FO_i^{k|l} = \Sigma_j pm_{ij}^{kl} \qquad (4)$$

wherein the $FO_i^{k|l}$ is the frequency of occurrence of OSs of order k, i.e. $OS_i^k$, in the OSs of order l, i.e. the $OS^l$. The latter two examples are given to demonstrate on how one can conveniently use the PM and the disclosed method/s to obtain many other desired data or information.

More importantly, from $PM^{kl}$ one can arrive at the "Co-Occurrence Matrix" $COM^{k|l}$ for OSs of the same order as follow:

$$COM^{k|l}=PM^{kl}*(PM^{kl})^T \qquad (5),$$

where the "T" and "*" show the matrix transposition and multiplication operation respectively. The COM is a N×N square matrix. This is the co-occurrences of the ontological subjects of order k in the partitions (ontological subjects of order l) within the composition and is one indication of the association of OSs of order k evaluated from their pattern of participations in the OSs of order l of the composition. The co-occurrence number is shown by $com_{ij}^{k|l}$ which is an element of the "Co-Occurrence Matrix (COM)" and (in the case of binary PMs) essentially showing that how many times $OS_i^k$ and $OS_j^k$ has participated jointly into the selected OSs of the order l of the composition. Furthermore, COM can also be made binary, if desired, in which case only shows the existence or non-existence of a co-occurrence between any two $OS^k$.

It should be noticed that the co-occurrences of ontological subjects can also be obtained by looking at, for instance, co-occurrences of a pair of ontological subject within certain (i.e. predefined) proximities in the composition (e.g. counting the number of times that a pair of ontological subjects have co-occurred within certain or predefined distances from each other in the composition) as was used in the incorporated reference the U.S. patent application Ser. No. 12/179,363. Similarly there are other ways to count the frequency of occurrences of an ontological subjects (i.e. the $FO_i^{k|l}$). However the preferred embodiment is an efficient way of calculating these quantities or objects and should not be construed as the only way implementing the teachings of the present invention. The repeated co-occurrences of a pair of ontological subjects within certain proximities is an indication of some sort of association (e.g. a logical relationship) between the pair or else it would have made no sense to use them together in one or more partitions of the composition.

Therefore in a first example of an association strength measure values one can have $$ASM^{k|l} \propto COM^{kl} \qquad (5.1)$$

or more generally:

$$ASM^{k|l}=F(COM^{kl}) \qquad (5.2)$$

wherein F is a predefined function ASM is the Association strength matrix whose entries being represented by its corresponding convenient data structure or an equivalent data structure carrying the information of essentially same data. The relation 5.1 regards the strength of association between the ontological subjects of the composition as being symmetric and being proportional to their co-occurrences. The Eq. 5.2 is the account for general form of an association strength wherein the function F acts on the whole COM matrix or its individual entries and is defined depends on the desired association type measure.

Those skilled in the art can store the information of the PMs, and also other mathematical objects of the present invention, in equivalent forms without using the notion of a matrix. For example each raw/column of the PM can be stored in a dictionary, or the PM be stored in a list or lists in list, or a hash table, a set, a counter, or a SQL database, or any other convenient objects of any computer programming languages such as Python, C, Perl, Java, C++, C#, AWK, LISP, etc. Such practical implementation strategies can be devised by various people in different ways.

Moreover, in the preferred exemplary embodiments the PM entries are binary for ease of manipulation and computational efficiency. However, in some applications it might be desired to have non-binary entries so that to account for partial participation of lower order ontological subjects into higher orders, or to show or preserve the information about the location of occurrence/participation of a lower order OS into a higher order OSs, or to account for a number of occurrences of a lower OS in a higher OS etc., or any other desirable way of mapping/converting or conserving some or all of the information of a composition into a participation matrix. In light of the present disclosure such cases can also be readily dealt with, by those skilled in the art, by slight mathematical modifications of the disclosed methods herein.

Furthermore, as pointed out before, those skilled in the art can store, process or represent the information of the data objects of the present application (e.g. list of ontological subjects of various order, list of subject matters, participation matrix/ex, association strength matrix/ex, and various types of associational, relational, novel, matrices, co-occurrence matrix, participation matrices, and other data objects introduced herein) or other data objects as introduced and disclosed in the incorporated references (e.g. association value spectrums, ontological subject map, ontological subject index, list of authors, and the like and/or the functions and their values, association values, counts, co-occurrences of ontological subjects, vectors or matrix, list or otherwise, and the like etc.) of the present invention in/with different or equivalent data structures, data arrays or forms without any particular restriction.

For example the PMs, ASMs, OSM or co-occurrences of the ontological subjects etc. can be represented by a matrix, sparse matrix, table, database rows, dictionaries and the like which can be stored in various forms of data structures. For instance each layer of the a Pm, ASM, OSM, RNVSM, NVSM, and the like or the ontological subject index, or knowledge database/s can be represented and/or stored in one or more data structures such as one or more dictionaries, one or more cell arrays, one or more row/columns of an SQL database, one or more filing systems, one or more lists or lists in lists, hash tables, tuples, string format, zip format, sequences, sets, counters, or any combined form of one or more data structure, or any other convenient objects of any computer programming languages such as Python, C, Perl, Java., JavaScript etc. Such practical implementation strategies can be devised by various people in different ways.

The detailed description, herein, therefore describes exemplary way(s) of implementing the methods and the system of the present invention, employing the disclosed concepts. They should not be interpreted as the only way of formulating the disclosed concepts, algorithms, and the introducing mathematical or computer implementable objects, measures, parameters, and variables into the corresponding physical apparatuses and systems comprising data/information processing devices and/or units, storage device and/or computer readable storage media, data input/output devices and/or units, and/or data communication/network devices and/or units, etc.

The processing units or data processing devices (e.g. CPUs) must be able to handle various collections of data. Therefore the computing units to implement the system have compound processing speed equivalent of one thousand million or larger than one thousand million instructions per second and a collective memory, or storage devices (e.g. RAM), that is able to store large enough chunks of data to enable the system to carry out the task and decrease the processing time significantly compared to a single generic personal computer available at the time of the present disclosure."

The data/information processing or the computing system that is used to implement the method/s, system/s, and teachings of the present invention comprises storage devices with more than 1 (one) Giga Byte of RAM capacity and one or more processing device or units (i.e. data processing or computing devices, e.g. the silicon based microprocessor, quantum computers etc.) that can operate with clock speeds of higher than 1 (one) Giga Hertz or with compound processing speeds of equivalent of one thousand million or larger than one thousand million instructions per second (e.g. an Intel Pentium 3, Dual core, i3, i7 series, and Xeon series processors or equivalents or similar from other vendors, or equivalent processing power from other processing devices such as quantum computers utilizing quantum computing devices and units) are used to perform and execute the method once they have been programmed by computer readable instruction/codes/languages or signals and instructed by the executable instructions. Additionally, for instance according to another embodiment of the invention, the computing or executing system includes or has processing device/s such as graphical processing units for visual computations that are for instance, capable of rendering and demonstrating the graphs/maps of the present invention on a display (e.g. LED displays and TV, projectors, LCD, touch screen mobile and tablets displays, laser projectors, gesture detecting monitors/displays, 3D hologram, and the like from various vendors, such as Apple, Samsung, Sony, or the like etc.) with good quality (e.g. using a NVidia graphical processing units).

Also the methods, teachings and the application programs of the presents invention can be implement by shared resources such as virtualized machines and servers (e.g. VMware virtual machines, Amazon Elastic Beanstalk, e.g. Amazon EC2 and storages, e.g. Amazon S3, and the like etc. Alternatively specialized processing and storage units (e.g. Application Specific Integrated Circuits ASICs, field pro-grammable gate arrays (FPGAs) and the like) can be made and used in the computing system to enhance the performance and the speed and security of the computing system of performing the methods and application of the present invention.

Moreover several of such computing systems can be run under a cluster, network, cloud, mesh or grid configuration connected to each other by communication ports and data transfers apparatuses such as switches, data servers, load balancers, gateways, modems, internet ports, databases servers, graphical processing units, storage area networks (SANs) and the like etc. The data communication network to implement the system and method of the present invention carries, transmit, receive, or transport data at the rate of 10 million bits or larger than 10 million bits per second;"

Furthermore the terms "storage device, "storage", "memory", and "computer-readable storage medium/media" refers to all types of no-transitory computer readable media such as magnetic cassettes, flash memories cards, digital video discs, random access memories (RAMSs), Bernoulli cartridges, optical memories, read only memories (ROMs), Solid state discs, and the like, with the sole exception being a transitory propagating signal."

The detailed description, herein, therefore uses a straightforward mathematical notions and formulas to describe exemplary ways of implementing the methods and should not be interpreted as the only way of formulating the concepts, algorithms, and the introduced measures and applications. Therefore the preferred or exemplary mathematical formulation here should not be regarded as a limitation or constitute restrictions for the scope and sprit of the invention which is to investigate the bodies of knowledge and compositions with systematic detailed accuracy and computational efficiency and thereby providing effective tools in knowledge discovery, scoring/ranking, filtering or modification of partitions of a body of knowledge, string processing, information processing, signal processing and the like.

Having constructed the $PM^{kl}$, we now launch to explain the methods of defining and evaluating the "association value/strength measures" and/or "value significances" of the ontological subjects of the compositions for various important cases of association or significance measures. One of the advantages and benefits of transforming the information of a composition into participation matrices is that once we attribute something to the OSs of particular order then we can evaluate the merit of OSs of another order in regards to that attribute using the PMs. For instance, if we find words of particular importance in a textual composition then we can readily find the most important sentences of the composition wherein the most important sentences contain the most important words in regards to that particular importance measure or aspect. Moreover, as will be shown, the calculations become straightforward, language independent and computationally very efficient making the method practical, accurate to the extent of our definitions, and scalable in investigating large volumes of data or large bodies of knowledge.

The investigation method/s and the algorithm/s are now explained in the following sections and subsections with the step by step formulations that is easy to implement by those of ordinary skilled in the art and by employing computer programming languages and computer hardware systems that can be optimized or customized by build or hardware design to perform the algorithm efficiently and produce useful outputs for various desired applications.

Direct/Indirect Associational Matrices

According to one embodiment of the present application, the relationships between the ontological subjects of a composition is derived, typified, and quantified from the way they have been employed in the composition. Sometimes, for instance, a relationship between two ontological subjects can be found explicit (e.g. both have participated together in one or more partition or co-occurred within predefined proximities with each other) and their type and strength of their relationship is determined and quantified according to teaching of the incorporated references.

For instance, in U.S. patent application Ser. No. 12/179,363 entitled "ASSISTED KNOWLEDGE DISCOVERY AND PUBLICATION SYSTEM AND METHOD", filed on Jul. 24, 2008, which is incorporated in this application, the applicant has introduced the concept of association value functions for ontological subjects of a composition. Accordingly an ontological subject was represented by a spectrum like function (e.g a vector data array or data structure) whose variables (e.g. the horizontal axis of the graphical representation of the spectrum) were ontological subjects and the value of the function was called association value. The association value function was introduced to show the strength of association of (e.g. relatedness, connections, etc.) between an ontological subjects with other ontological subjects based on count of their co-occurrences within certain or predefined proximities, and the importance (e.g. popularity, or other measures of value significances as defined and disclosed in the incorporated references herein) of the associated ontological subjects.

In another instances the relationship cannot be found explicit. For example in U.S. patent application Ser. No. 13/608,333 filed on Sep. 10, 2012, entitled "METHODS AND SYSTEMS FOR INVESTIGATION OF COMPOSITIONS OF ONTOLOGICAL SUBJECTS" which claims priority from U.S. provisional application No. 61/546,054 filed on Oct. 11, 2011, the concept of association spectrum and association strength measures were introduced and used to find less known or hidden related ontological subjects. For instance from the one or more of the "association strength measures" one could go on and define a measure for evaluating the hidden association strength of OS of order k even further by:

$$ASM\_x3^{k|l} = (ASM\_x1^{k|l})^T \times ASM\_x2^{k|l} \quad (5.3)$$

wherein $ASM\_x3^{k|l}$ stands for type x3 "association strength measure" which can basically be represented as a N×N matrix (please see the Eq. 17-26 of the U.S. patent application Ser. No. 13/608,333 filed on Sep. 10, 2012). The Eq. 5 takes into account the transformative or hidden association of OSs of order k (e.g. words of a textual composition or BOK) from one asm measure and combines with the information of another or the same asm measure to gives another measure of association that is not very obvious or apparent from the start. This type of measure therefore takes into account the indirect or secondary associations into account and can reveal or being used to suggest new or hidden relationships between the OSs of the compositions and therefore can be very instrumental in knowledge discovery and research.

A very important, useful, and quick use of exemplary "association strength measures" of Eq. 17-26 of the incorporated reference application Ser. No. 13/608,333 is to find the real associates of a word, e.g. a concept or an entity, from their pattern of usage in the partitions of textual compositions. Knowing the associates of words, e.g. finding out the associated entities to a particular entity of interest, finds many applications in the knowledge discovery and information retrieval. In particular, one application is to quickly get a glance at the context of that concept or entity or the whole composition under investigation. The choice and the evaluation method of the association strength measure is important for the desired application. Furthermore, these measures can be directly used as a database of semantically associated words or OSs in meaning or semantic. For instance if the composition under investigation is the entire (or even a good part of) content of Wikipedia, then universal association of each entity (e.g. a word, concept, noun, etc.) can be calculated and stored for many other applications such as in artificial intelligence, information retrieval, machine learning, knowledge discovery and numerous others.

Moreover, from the "association strength measures" one can also obtain and derive various other "value significance measures" which poses more of intrinsic, or in relation to a desired ontological subject, type of significances. Furthermore, for instance, in the application Ser. No. 12/939,112 various types of $asm_{i \to j}^{k|l}$ (e.g. Eqs. 31-38, 39-50, and 55-64 of the U.S. patent application Ser. No. 13/608,333 filed on Sep. 10, 2012) were used to define and calculate other exemplary "value significance measures", i.e. $vsm_i^{k|l}$, in order to evaluate the intrinsic importance, credibility, relational novelty significance/importance, relative or intrinsic novelty significance and importance of OSs of different orders.

Moreover, Eqs 51-54 of the incorporated U.S. patent application Ser. No. 13/608,333, filed on Sep. 10, 2012, introduced novel association types and consequently defined the "Novel Association Strength Measures" and "Association Novelty Value Significance Measures" along with their ways of obtaining information and data values of such measures from a composition of ontological subjects.

Accordingly, many different measures in respect to various aspects of significance and importance of the type of relationships between ontological subjects of a composition were revealed and ways of building, and obtaining values of such aspectual significances and associations were disclosed in the incorporated references. Data structures carrying such data or information, as the result of following and executing the teachings of the aforementioned disclosures, in order to making them useable for further processing/storing/indexing/transmitting and applications were also disclosed In this application another measure of hidden relationship is given using the one or more association strength measures or the corresponding matrix as the following.

$$NASM = (ASM \times ASM^T) \cdot / COM \quad (6)$$

wherein "*", "T" and "·/" stands for matrix multiplication operation, matrix transposition and element by element division of matrices (i.e. an element of a first matrix is divided by the same element in a second matrix) respectively. The matrix NASM amplifies the less know relationships between ontological subjects. That is those Oss that are less co-occurred with each other but has strong association spectrum correlations. In reality many of the entries of COM are zero and therefore value of some of the entries of NASM become infinite. To prevent such incidences the matrix COM can be made to become nonzero by adding an small number (e.g. an integer, real or complex number) to the nonzero values of COM or to all entries of COM (for instance one can add the each entries of COM with the integer number 1. Here for simplicity both "association strength matrixes" (ASMs) are shown as the same association type, in general the ASM matrixes could be of different type and order as several of them were introduced in the incorporated reference the U.S. patent application Ser. No. 13/608,333 (e.g as well as in EQ. 5 above)

For further clarity, the individual entries of NASM can be calculated as:

$$\text{nasm}_{ij}^{k|l} = c(\Sigma_q \text{asm}_{iq}^{k|l} \cdot \text{asm}_{jq}^{k|l})/\text{com}_{ij}^{k|l} \quad (6.1)$$

wherein "c" is a predefined function (e.g. such as normalization factors or functions), and $\text{asm}_{iq}^{k|l}$, and $\text{asm}_{jq}^{k|l}$=0, 1, 2, ... N are the association spectrums corresponding to $OS_i^k$ and $OS_j^k$ respectively. The and $\text{vasm}_{ij}^{k|l}$ is the individual entry of the NASM matrix or its data structure and correspond to the value of the "Novel Association Strength Measure" of said entomological subjects of $OS_j^k$ and $OS_j^k$.

The novel association strength measure of Eq. 6 or Eq. 6.1 is amplified between those ontological subjects of the composition where/when there is low co-occurrences between them but there is a substantial indirect association spectrum overlap (e.g. similarity, correlation etc.) between their association value/strength spectrums.

Alternatively, in yet another instance this application is looking for those OSs that have not co-occurred with each other in the partitions of a composition but nonetheless they are having association spectrum (spectral) overlaps.

In this case this disclosure introduces another type of association strength matrix which is regarded as a measure of such relationships which are not known explicitly.

Accordingly we introduce "Indirect Association Strength Matrix" or "IASM" for short, as the following:

$$\text{IASM} = (\text{ASM} \times \text{ASM}^T) \cdot \text{Invert}(\text{COM}) \quad (7)$$

wherein "×", "T", and "·" stands for matrix multiplication, matrix transposition, and element-wise matrix multiplication (i.e. an element of a first matrix is multiplied by the same element in a second matrix) and the and "Invert" is an operation that replace nonzero element of matrix with zero values and vice versa (i.e. the zero value elements of the matrix is replaced with nonzero values (e.g. value of 1) respectively. Again the ASM here can stand for various types of association strength measures and is corresponding to one or more data structures or data arrays (e.g. matrix numerical array) that comprise such data corresponding to the said measures of association between ontological subjects of the composition.

Again further clarity, the individual entries of IASM can be calculated as:

$$\text{iasm}_{ij}^{k|l} = c(\Sigma_q \text{asm}_{iq}^{k|l} \cdot \text{asm}_{jq}^{k|l}) \cdot \text{Invert}(\text{com}_{ij}^{k|l}) \quad (7.1)$$

wherein "c" is a predefined function (e.g. such as normalization factors or functions), and $\text{asm}_{iq}^{k|l}$, and $\text{asm}_{jq}^{k|l}$=0, 1, 2, ... N are the association spectrums corresponding to $OS_i^k$ and $OS_j^k$ respectively, and $\text{iasm}_{ij}^{k|l}$ is the individual entry of the IASM matrix or its data structure and correspond to the value of the "Indirect Association Strength Measure" of said entomological subjects of $OS_i^k$ and $OS_j^k$.

It is noticed that that each row or columns of the association strength matrix is corresponded to an ontological subject and the data in each the row or column can be represented as vector in a multi-dimensional space of ontological subjects. The vector therefore can be regarded as an association spectrum of ontological subjects corresponded to the ontological subject respective of the row or the column. Therefore in essence the novel or indirect association strength/value of each two of ontological subjects is in fact a function of their association strength/value vectors and their co-occurrences (in Eq. 6) or the invert of the co-occurrences (in Eq. 7). For instance in one embodiment the "Novel Association Strength" of two ontological subjects (in Eq. 6) is the result of inner product of their association spectrum vectors multiplied by their co-occurrence number. Or for instance in one embodiment the "Indirect Association Strength" of two ontological subjects (in Eq. 7) is the result of inner product of their association spectrum vectors multiplied by the invert of their co-occurrence number.

Following the teachings of the incorporated references, once the association strength values of ontological subjects of order k are obtained then the corresponding data or data structure can be used to obtain value significances of another order, e.g. l, can be readily and generally be obtained (in matrix form) by:

$$\text{RVSM}^{l \to k|kl} = \text{RASM}^{l \to k|kl} = \text{rvsm}_{ij_k}^{l \to k|kl} = (\text{PM}^{kl})^T \times \\ \text{ASM}^{k|l}, i_l = 1, 2, \ldots M \text{ and } j_k = 1, 2, \ldots N \quad (7.2)$$

wherein the "T" shows the transposition matrix operation and $\text{RVSM}^{l \to k|kl}$ is the "Relational Value Significance Matrix" and the RVSM_1 is the "first type relational value significance measure".

It is noticed that $\text{ASM}^{k|l}$ is a N×N matrix which in here is used generally as a representative and can be replaced with for any type of association strength measures (e.g. NASM, IASM, RASM, etc.) and $\text{RVSM}^{l \to k|kl}$ is a M×N matrix indicating the relatedness/association of $OS_i^l$ (e.g. a sentence and i=1 ... M) or its "relational value significance" to a $OS_j^k$ (e.g. a word and j=1 ... N), (please see the Eqs. 27-38 of the U.S. patent application Ser. No. 13/608,333).

Various types of RVSM with granule distinctions has been given and explained in details in the incorporated reference the U.S. patent application Ser. No. 13/608,333

Remembering the $\text{ASM}^{k|l}$ in general is asymmetric and have different interpretation in which the rows of $\text{ASM}^{k|l}$ indicates the value of association to other and column indicates the value of being association with by others. Therefore the $\text{RVSM}^{l \to k|kl}$ is indicative of a degree that an OS of order l, $OS_i^l$, (e.g. sentences) containing the OSs of order k, $OS^k$ (e.g. the words) that are used to explain or express or provide information regarding the target $OS_j^k$ (i.e. containing the words that are highly associated with the target OS). Whereas, for instance, the RVSM_$2^{l \to k|kl}$ (see Eq. 33 of incorporated reference the U.S. patent application Ser. No. 13/608,333) is indicative of a degree that an $OS_i^l$ (e.g sentences) containing the $OS^k$ (e.g. the words) for which the target $OS_i^k$ is used or participated to explain or express or provide information about them (i.e. containing the words that the target OS is highly associated with).

Generally therefore once the association strength values (using one or more association strength measures) or various/aspectual significance values of ontological subjects of a particular order, e.g. k, are obtained it can be used to weigh or assign an aspectual association/relatedness or significance/importance to different parts/partitions, e.g OSs of order l, of the composition readily by using the data structures of participation matrixes/patterns. Again this granule distinctions have been given and explained in details and disclosed in numerous places in the incorporated references such as the U.S. patent application Ser. No. 13/608,333, the U.S. patent application Ser. No. 13/740,228, the U.S. patent application Ser. No. 14/274,731, or the US patent application Ser. No. 14/151,022.

It is worth to mention here that the bigger the data collection (e.g. the larger the composition or the collection of composition/content under investigation) the more reliable and meaningful the resulting data values would be for being further used in desired applications or service such as intelligent conversation, or knowledge discovery, automatic machine learning and discovery, or assisting human in knowledge discovery or better decision making and numerous other applications etc. The system, therefore to carry these computations is composed of one or more computing systems with at least 1 Gbyte of RAM and a processor with at least 1 GHz clock speed or compound processing speed of more than one Giga instructions per second. Once the composition become big or for the so called big data analysis data objects of the present invention (e.g. PMs, COM and ASMs) become extremely big and occupy relatively (according to current status quo) very large amount of computing memories and storages. Accordingly for big data analysis (e.g. input compositions of more than 10 Gb) the data objects of current disclosure then can be divided and stored or manipulated in a distributed type of calculating environments. The concepts and corresponding mathematical formulation and algorithms are still the same but it might need to be calculated in several stages or be performed by several processing units/devices.

For instance one may store every one or more rows of an association strength matrix in separate data objects or files in order to become able to handle the data processing and calculations in reasonable time and reasonable data processing capabilities. Accordingly, for example, the corresponding matrix multiplications therefore should be done piece-wise and tracks of each piece by piece multiplications are kept in new data objects and/or piece-wise resulting data objects being kept in different files or data structures/objects etc.

Accordingly, in these situations various strategies/approximations (e.g. hardware optimization, application specific hardware designs, or theoretical improvements in the numerical analysis) for processing the massive big data can be devised to speed up the processing. Therefore the various possible approaches, ways, techniques, and implementation strategies for carrying out the processing of the composition and the resultant massive big data objects and structures can be done and performed by different people differently which will not fall out of the scopes and sprits of the current disclosure.

Beside the implementation strategies, by having built the data structures of the data values of the different types of association strength measures one can use, for example, the concepts and algorithms (or any other desired ways of representations of the data respective of these association strengths) to show and use the association strength data for variety of purposes such as visual/graphical navigation, interactive maps, and, for instances, other allocations mentioned disclosed in the incorporated reference of the current invention.

In particular, graphs can be made to show novel relationships of the ontological subjects of the composition, or graphs (e.g. interactive) for showing indirect relationships between the ontological subjects of the composition based on the data of their participation and co-occurrences and the values of the their association value/strength measure or the association value/strength spectrums.

More particularly, the association spectrums can be used to weigh the partitions of the composition based on the association value/strength spectrums of the ontological subjects based on the one or more desired types of association value/strength measures.

Visualization and Interactive Graphs

Having the data of various types of introduced association strengths and measures is useful for machines to learn as much about ontological subjects of universe/s to generate yet many more novel applications and outputs as mentioned before, but representing such data in a way for human comprehension and interaction/navigation would also become desirable in order to gain instant benefits from such calculations and data processing for a human (or even a machine with visual comprehension) user.

Accordingly in this section of this disclosure attempts are made to introduce one or more visual objects (e.g. graphs with nodes and/or interactive visual presentation of these data) to be used, for instance, along with user interfaces.

Figure 3:
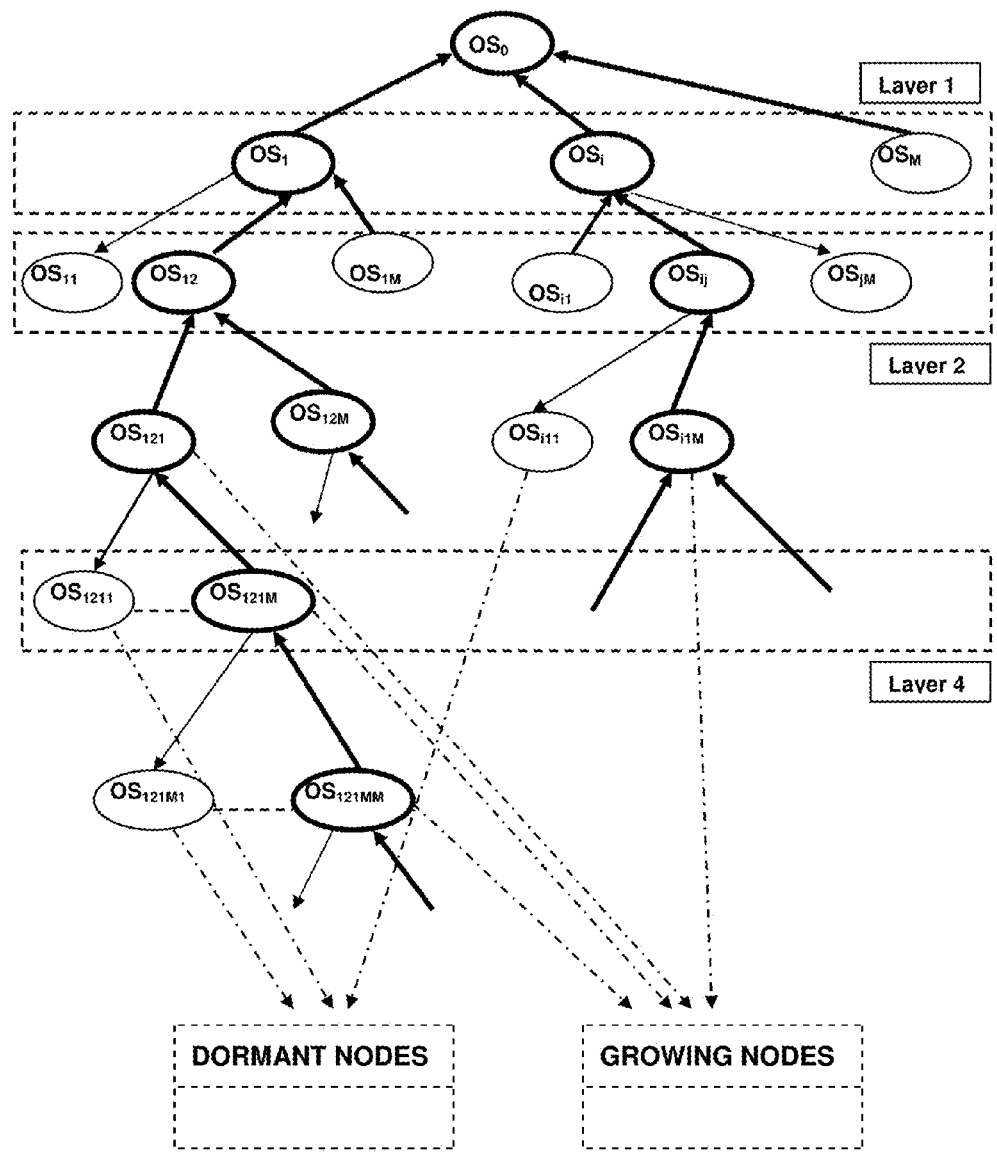
FIG. 3: is one graphical representation of OSM, thick line circles are growing nodes and thick arrows show the connection between growing nodes (i.e. non-dormant nodes, see the detailed description), thin line circle show dormant nodes and thin arrows show the connection between a growing node and its dormant associated node. Dormant node is an image of a growing node somewhere in the map. In this representation embodiment dormant nodes do not point to their growing positions. The OSM can be a free-form 2D representation of the ontological subject map of a composition.
Figure 4A:
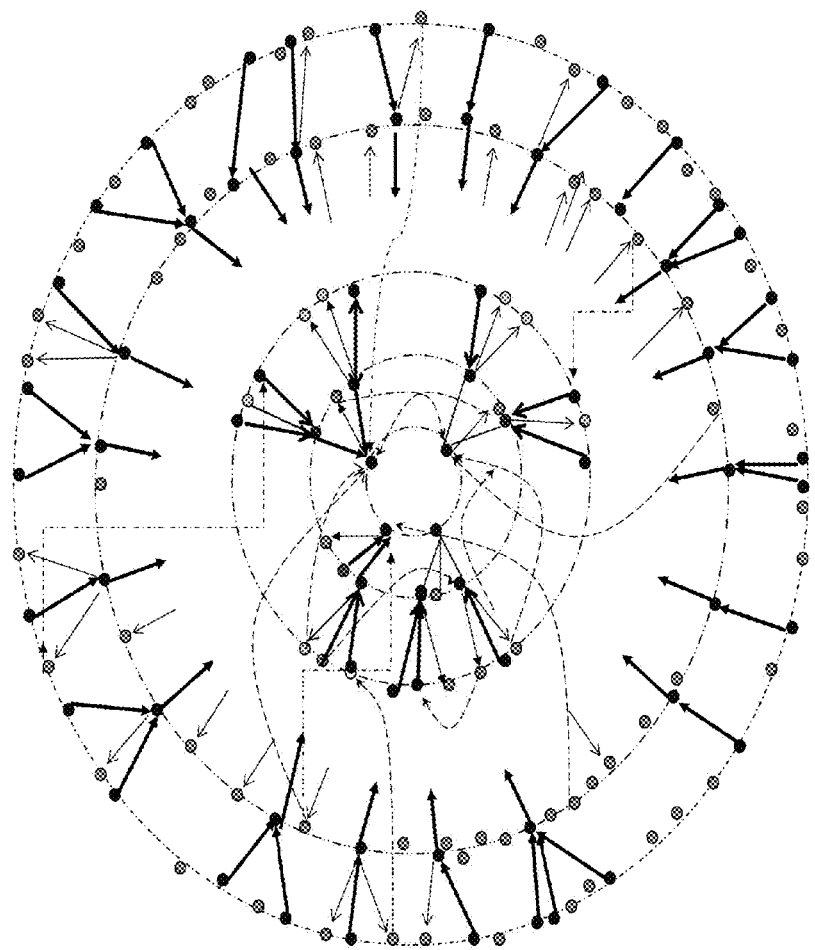
FIG. 4a: is another graphical representation of OSM, wherein nodes are placed around co-centered circles of different layers (shown by broken line large circles). In this representation embodiment, the small darker filled circles are indicative of a growing node, and thick arrows show the connection between two growing nodes, and gray filled circles show the dormant node whereas the thinner arrow shows the connection between a growing node to a dormant node or a dormant node to its original growing place in the map. Dormant node is an image of a growing node somewhere in the map and in this representation embodiment dormant nodes point to their growing positions.

To begin with we introduce a method of showing such visual objects in the forms of graph as shown, for instance, in the FIGS. 3, 4a, b, c, and d. Let's call these types of graphs as Ontological Subjects Maps" or OSM for short as it was introduced in the incorporated references such as the U.S. patent application Ser. No. 12/179,363, the U.S. patent application Ser. No. 12/547,879, the U.S. patent application Ser. No. 13/608,333, the U.S. patent application Ser. No. 13/740,228, the U.S. patent application Ser. No. 14/274,731, or the U.S. patent application Ser. No. 14/151.022.

Now we describe the steps of building an OSM for a composition describing universe 1, i.e. u1, in what follows here.

Having calculated and obtained and/or stored the data of one or more of association value/strength measures we can build different graphical representation of the ontological subjects of the composition (i.e. the universe of the composition) to show the different aspects of context of the composition. The data structure carrying the data for simplicity is corresponded to, for example, a matrix data array.

Figure 2:
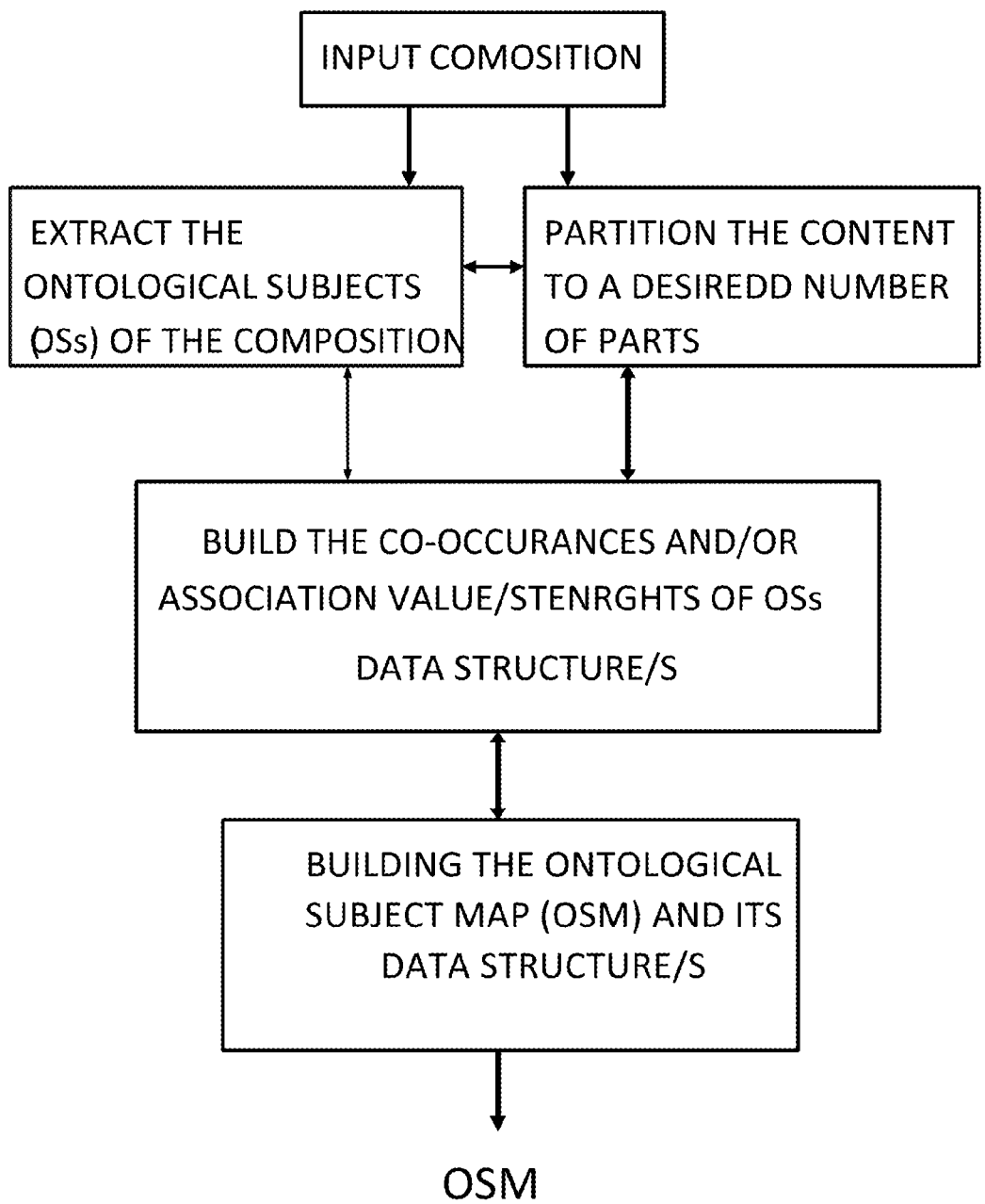
FIG. 2: is a flowchart of building an Ontological Subject Map (OSM) from an input composition by building and using data structures of co-occurrences and association value/strength (various types of association strength such as direct, or indirect or novel association strengths) of ontological subjects of the composition.

FIG. 2 shows one simplified embodiment of a flowchart of building an OSM for a composition, with the composition as the input to the system of computer readable medium. FIG. 2 shows the basic building blocks of constructing an OSM for a composition as described above. Before launching into describing the algorithm and the method of building an OSM for a composition, we can look at the representation and specifics of OSM as a graph.

OSM Graphs:

The OSM is essentially a graphical/visual object (e.g. a 2D or 3D directed weighted graph having desired visual objects as their nodes) in which each OS is represented by a node as shown in FIGS. 3, and 4 in its simplest and conceptual representation. FIGS. 3 and 4, show two exemplary different ways of drawing such a map. In FIG. 3, the map is in the form of a tree and in FIG. 4 the OSM is depicted in the form of multilayer circles, wherein in FIG. 3 the nodes distributed over a line and in FIG. 4 the nodes are distributed over a circle, according to a predefined algorithm. The OSM building algorithm take data of one or more data structures corresponding to one or more association strength measures of ontological subjects of the composition (i.e. one or more of the ASMs) and process and build other data structures that is used by visual displaying computer implement modulus to produce a two or three dimensional (2D/3D) and/or interactively changing shapes and/or time varying visual objects such as a video signal displayable over a display devices.

FIG. 3 illustrates, again for conceptual depiction and simplicity, two types of nodes and two types of connections between the nodes. The thicker line ellipse shows a growing node that is connected to at least one node in its below layer in the graph while the thinner line ellipse indicates a dormant node that is only connected to its above or same layer node in the graph. Similarly the thicker line arrows show the connection between two growing nodes and the arrow is from a below layer growing node to its above layer growing node, and the thinner line arrows show the connection between a growing node and a dormant node and the arrow is from the above layer growing node to its below layer dormant node. As seen in FIG. 3 a below layer is numbered higher than an above layer, e.g. layer 3 is below layer 2. The text inside the ellipses denotes one way of indexing the nodes as described in the U.S. patent application Ser. No. 12/179,363, filed on Jul. 24, 2008, by the same inventor.

A dormant node is in fact a mirror of a growing node somewhere in the graph. The corresponding index of the graph contains the information related to the address of originally growing position of the dormant node. In other words, dormant nodes points to their originally growing positions in the graph. However, in FIG. 3 the connection between a dormant node and its original position is not shown for clarity and simplicity of the represented graph.

FIG. 4 depicts another exemplary graphical representation of an OSM. In this representation's embodiment, nodes are positioned along co-centered circles. The growing nodes in this embodiment are shown by darker filled circles and dormant nodes are shown by gray filed circles. Similar to FIG. 3 the growing nodes are connected with thick line arrows and from a below layer growing node to its above layer growing node. Again similar to FIG. 3 the connection between a growing node and its dormant node is shown by thinner line arrow which originates from a growing node to its dormant node. As seen in FIG. 4 the connection (i.e. the broken line arrow) from a dormant node to its originally growing position in the graph is also shown. This help to visualize the centrality of each node, i.e. each OS. In FIG. 4, a below layer is further away from the center than an above layer.

It should be noticed that in FIGS. 3 and 4, only few exemplary connections have been depicted for clarity of the picture while making the intended point. Moreover, as seen, each growing node points to only one growing node in the above layer and connect to one or more nodes in below layer, and a dormant nodes is not connected to any node from below layers.

Figure 4B:
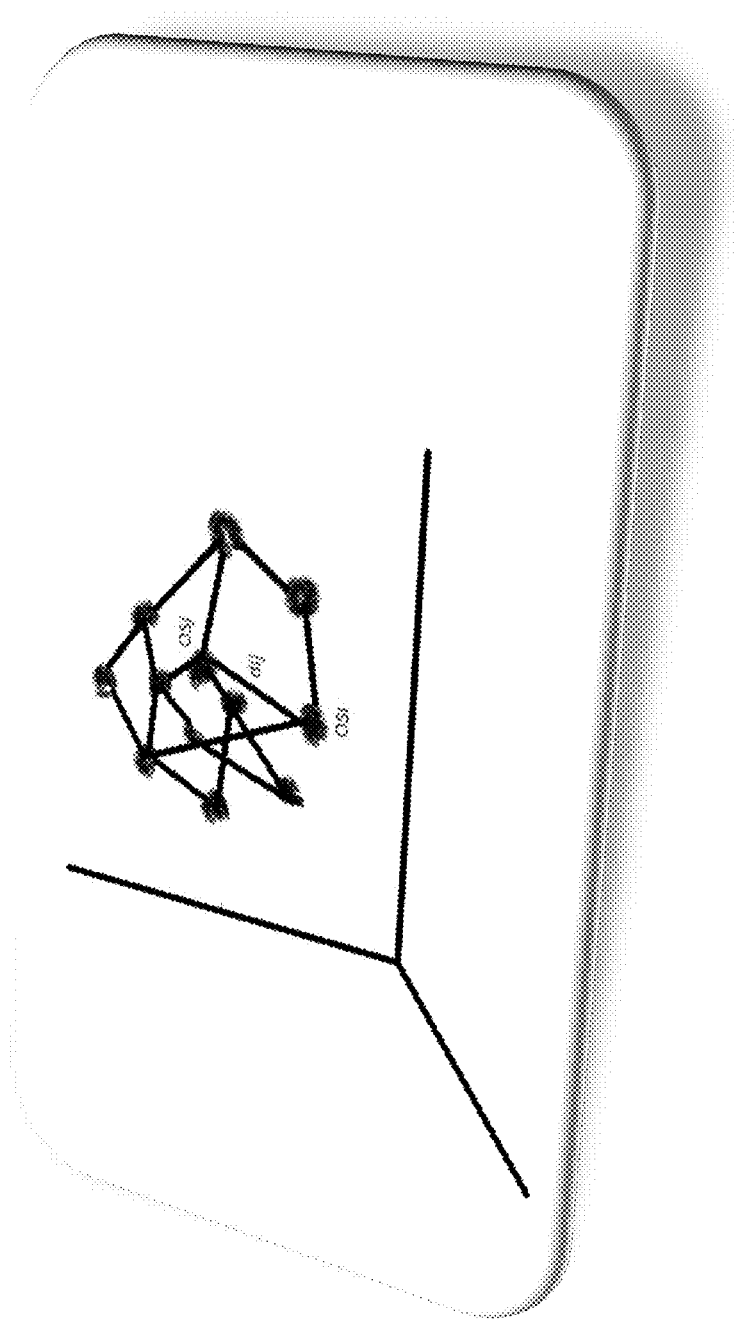
FIG. 4b: is another graphical representation of OSM of a composition in 3D graphical representation.
Figure 4C:
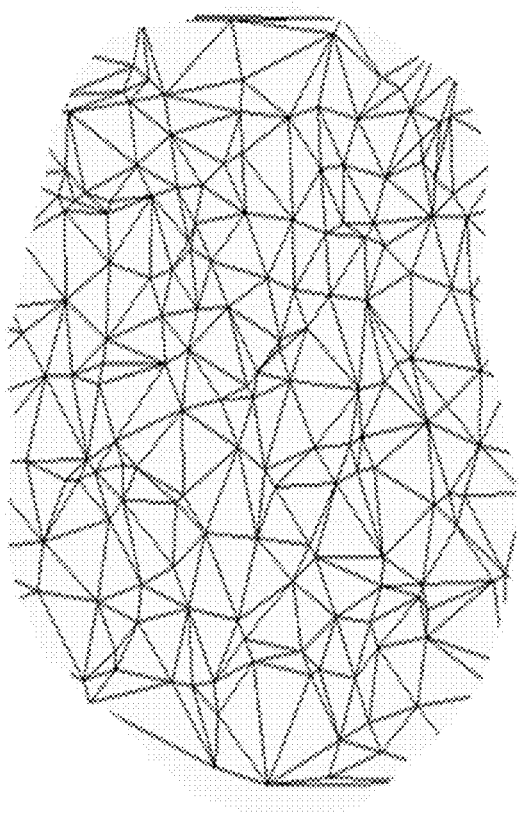
FIG. 4c: is closer view or zoomed view of the 3D graphical representation of OSM of a composition.

In FIGS. 4b and 4C. there is shown an exemplary three dimensional ontological subject map of a composition.

In the U.S. patent application Ser. No. 12/955,496, filed on Nov. 29, 2010, now U.S. Pat. No. 8,775,365 a graph corresponding to an OSM was disclosed that the distance of an associate to its a parent ontological subjects (i.e. a parent node in the graph) was a function (e.g. linearly proportional) of the reciprocal of the association strength of the child node to its parent node.

So that $$d_{ij}^{k|l}(OS_i^k, OS_j^k) \propto \frac{1}{asm_{ij}^{k|l}} \tag{8}$$

Wherein the $d_{ij}$ is the distance between a, for instance, a child node (e.g a graphical object) representing $OS_i^k$ for example as a child node of another node representing $OS_j^k$ as a parent node or vice versa and is represented by its coordinates in the graphical space (e.g. x, y, and z). For instance in a 3D graphical space is given by $$d_{ij} = \sqrt{(x_i-x_j)^2+(y_i-y_j)^2=(z_i-z_j)^2} = f(asm_{ij}^{k|l}) \tag{9}$$

Wherein f is a predefined function, $x_i$, $y_i$, and $z_i$ are the coordinates of the node corresponding to $OS_i^k$ and $x_i$, $y_i$, and $xz_i$ are the coordinates of the node corresponding to $OS_j^k$.

Having the coordinates such graphs can be built bay computer program modulus and/or graphic programming using different computer programming languages such as Java, Python, c++ and the like or using other available computer graphical module such as OpenG1, JAVAJX, Pygame, JavaScript, WebG1 etc.

In practice different ontological subjects can have a number of ontological subjects as their associates or a child node in the corresponding OSM graph. That is a child node can have two or more parent nodes.

Accordingly, either in 2 dimensional or 3 dimensional graphical representation space, there could arise a conflict in calculating the distances of a child to two or more parents in the OSM.

Therefore to represent sensibly and optimally the distances of all nodes (child or parents) the distances between the nodes should be optimized to optimally represent, visually, the ontological subjects' relationships (the association) of the composition using the OSM. The coordinates of the nodes should be selected in such a way to satisfy the optimization problem of the following:

$$TD = \Sigma_i \Sigma_j d_{ij} = \text{minimum} \tag{10}$$

Eq. 10 yield the coordinates of nodes for visual depictions, visualization, game developments, video production etc. Solving such optimization problem is not necessarily a trivial exercise, however approximation with few good initial selections of some of the nodes' coordinates can speed up such an optimization.

Figure 4D:
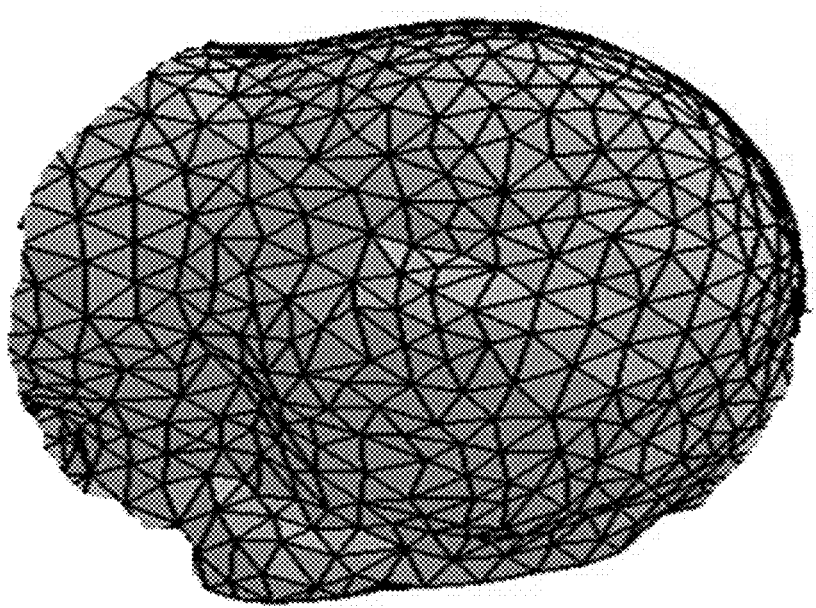
FIG. 4d: generally shows the free-form 3D shape (e.g. a 3D mesh) of a graphical representation of OSM of a composition. Different composition can give different 3D body shapes.

FIG. 4D for instance shows an exemplary 3D mesh of an OSM of a composition. As can be expected different composition can produce different shapes, or different association strength measures can also produce different shapes. If the ASM for instance is varied versus a parameter then the shape of FIG. 4D can generate, by varying the parameter, an animation or be used for game development or for educational game or multimedia composition generation etc.

An Examplary OSM Building Algorithm

An ASM (e.g. an association strength matrix) can be viewed as adjacency matrix of a graph representing ontological subjects with graphical objects (such as anode) and their connection is shown by using the data of the association strengths between the ontological subjects or the nodes. Such a graph in practice will be highly interconnected and therefore hard to comprehensible. Accordingly graph with more visual clarities while showing the significance and important aspects of the associations between the ontological subjects of the composition become desirable.

In the preferred method, the OSM in FIG. 3, or 4 is built, using the information of co-occurrence matrix C and association matrix A, which are derived from the participation matrix PM, based on the following algorithm:

Select a first set of ontological subjects, having at least one member, which have the highest importance factor, e.g. highest occurrence counts or value significance measure value. In the map put the first set of OS in the first layer and showing each OS by a node. For each of this first layer OSs form an association set, having a desired number of OSs that have association value of higher than a predetermined threshold, with each first layer OS. This can be done by looking at the adjacency list of each OS in the co-occurrence matrix C or the associated strength matrix, ASM, and select the first associated sets of ontological subjects, each set associated with each of first layer OSs. Create a second layer of nodes, underneath first layer OSs, and place the associated set of each first layer OS in the second layer underneath its corresponding the first layer OS (also called a parent node here). Each OS, i.e. node, in the associated set placed in the second layer points to its first layer parent node if that OS appears in only one associated set and is not a member of first layer set. In this case the node is called growing or non-dormant. If an OS in the second layer is also a member of first layer set then in the map the parent node points to that OS in the second layer and that OS ultimately address or points to its first appeared position in the first layer. In this case that node in the second layer is called dormant, and would not grow further than the second layer.

If an OS is not a member of first layer but is a member of more than one associated set, then that OS only growing under the parent with which it has the highest association value, points to that parent, and becomes dormant for other associated parents. When the OS becomes dormant, the parents point to that dormant OS and that dormant OS address or points to its growing position in the second layer.

For each of growing OSs of the second layer (called again the parent node as well), form an association set, having a desired number of OSs that have association value of higher than a predetermined threshold, with each of growing OS in the second layer. Create a third layer of nodes, underneath second layer, and place the associated set of each of growing nodes of the second layer OS in the third layer underneath its corresponding the second layer growing OS. Each OS, i.e. node, in the associated set placed in the third layer points to its second layer parent node if that OS appears in only one associated set and is not a member of the first or the second layer set. If an OS in the third layer is a member of above layers, i.e. the first or the second layer, then in the map the parent node points to that OS in the third layer and that OS ultimately address or points to its first appeared position (growing) in the above layers. In this case that node in the third layer is called dormant, and would not grow further than third layer.

If an OS is not a member of above layers but is a member of more than one associated sets, then that OS only growing under the parent to which it has the highest association value, points to that parent, and becomes dormant for other associated parents. When an OS becomes dormant, the parents point to that dormant OS and that dormant OS address or points to its growing position in the same layer.

For each growing node in the third layer repeat the process and create more layers of the Map until all ontological subjects of the universe found a growing position in the map or until any other predetermined or desired criteria is met. Consequently or at the same time, index the map with appropriate indexing method. The indexing could be done, for example, by storing the adjacency matrix of the map or storing the adjacency list for each growing node in the map. As seen again, an OS can have one growing position but be dormant associates, i.e. dormant node, for many other growing OSs. Therefore dormant nodes are mirrors of growing nodes and essentially pointing to their growing position address in the index or having the same OS number when represented by a matrix.

After building the OSM and the index, one can, for instance, have a directed weighed graph that can be used for knowledge exploration, navigation, and many other applications such as building an artificial neural network. More importantly we can intrinsically measure the importance of each OS in the context of its universe.

Adjacency Matrix of an OSM Graph

When we consider the OSM as a graph then mathematically we can represent the corresponding graph as: OSM= (OS, E) wherein OS is the set of ontological subject of the universe and E is the set of edges or connections and it is either a growing connection or dormant connections and can be divided as E={$e_{i,j}$ V $\overline{e_{i,j}}$} in which $e_{i,j}$ means that there is a growing type connection between i and j (the arrow is from $OS_j$ to $OS_i$) and $\overline{e_{i,j}}$ is a dormant connection (the arrow is from $OS_i$ to $OS_j$).

The ontological subject map or a graph (e.g. a directed weighted graph) that can be also shown by its adjacency matrix as:

$$M = \begin{matrix} & OS_1 \ldots OS_N \\ \begin{matrix}OS_1 \\ \vdots \\ OS_N\end{matrix} & \begin{pmatrix} m_{11} & \ldots & m_{1N} \\ \vdots & \ddots & \vdots \\ m_{N1} & \ldots & m_{NN} \end{pmatrix} \end{matrix} \quad (11)$$

in which, in one preferred embodiment of the invention, we have:

$$\begin{cases} m_{i,j} = asm_{i,j} \text{ for } e_{i,j} \\ m_{i,j} = asm_{j,i} \text{ for } \overline{e_{i,j}} \\ m_{i,j} = 0 \text{ everwhere else} \end{cases}$$

The matrix M is most of the time asymmetric and sparse. For graphs of similar to FIG. 3 the matrix M can further be divided by two adjacency matrix one showing the growing type connections and another showing the dormant type connections.

OS Spectrums

Going back to the concept of association strength matrix which basically carries the information about the association between ontological subjects of a universe or a composition according to at least one of the association strength measure, one can build a data structure such as a numerical vector or a computer programming dictionary object for an ontological subjects corresponding to its most desired associated ontological subjects (e.g. a set of ontological associated to an ontological subject, i.e. an associated set).

Figure 6:
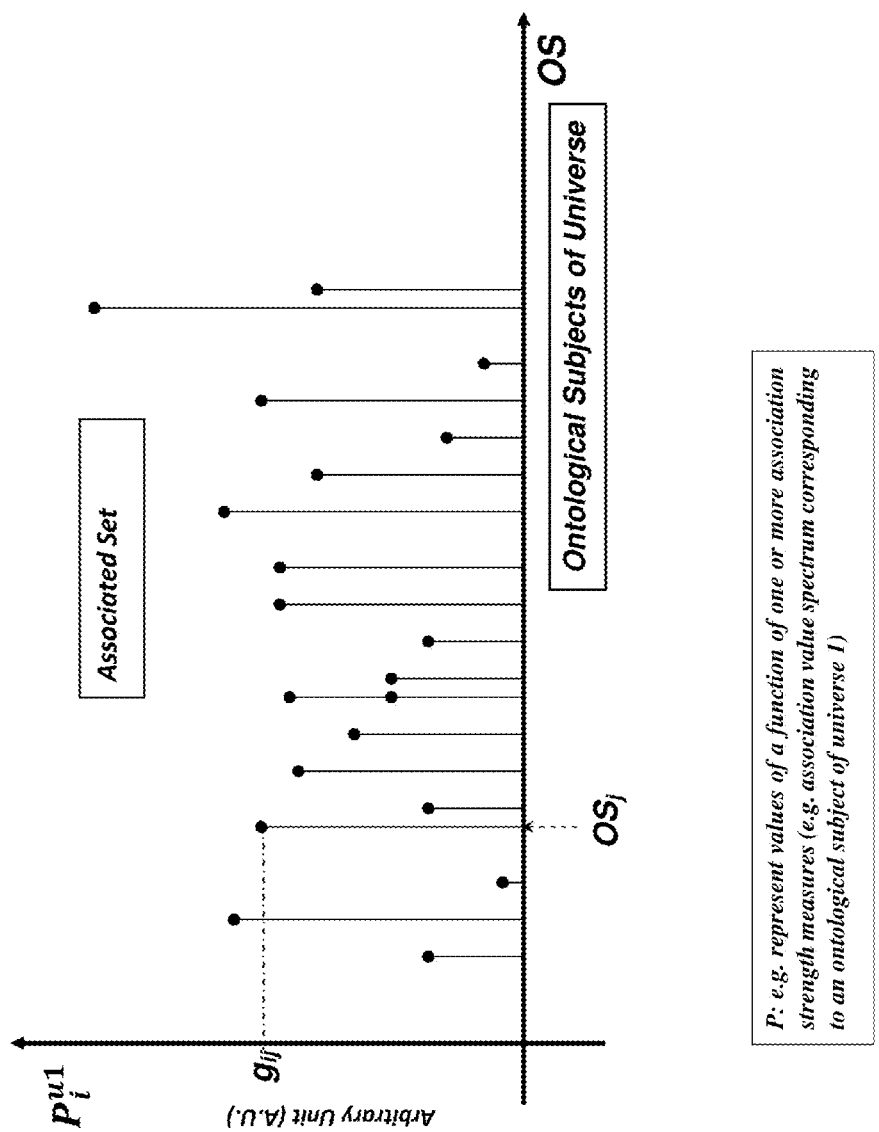
FIG. 6: is an illustration of an Ontological Subject spectrum of universe 1 versus its associated OS.

Such a data structure is viewed as a spectrum that shows the association of ontological subjects a composition to a particular ontological subject as shown in FIG. 6

Figure 5:
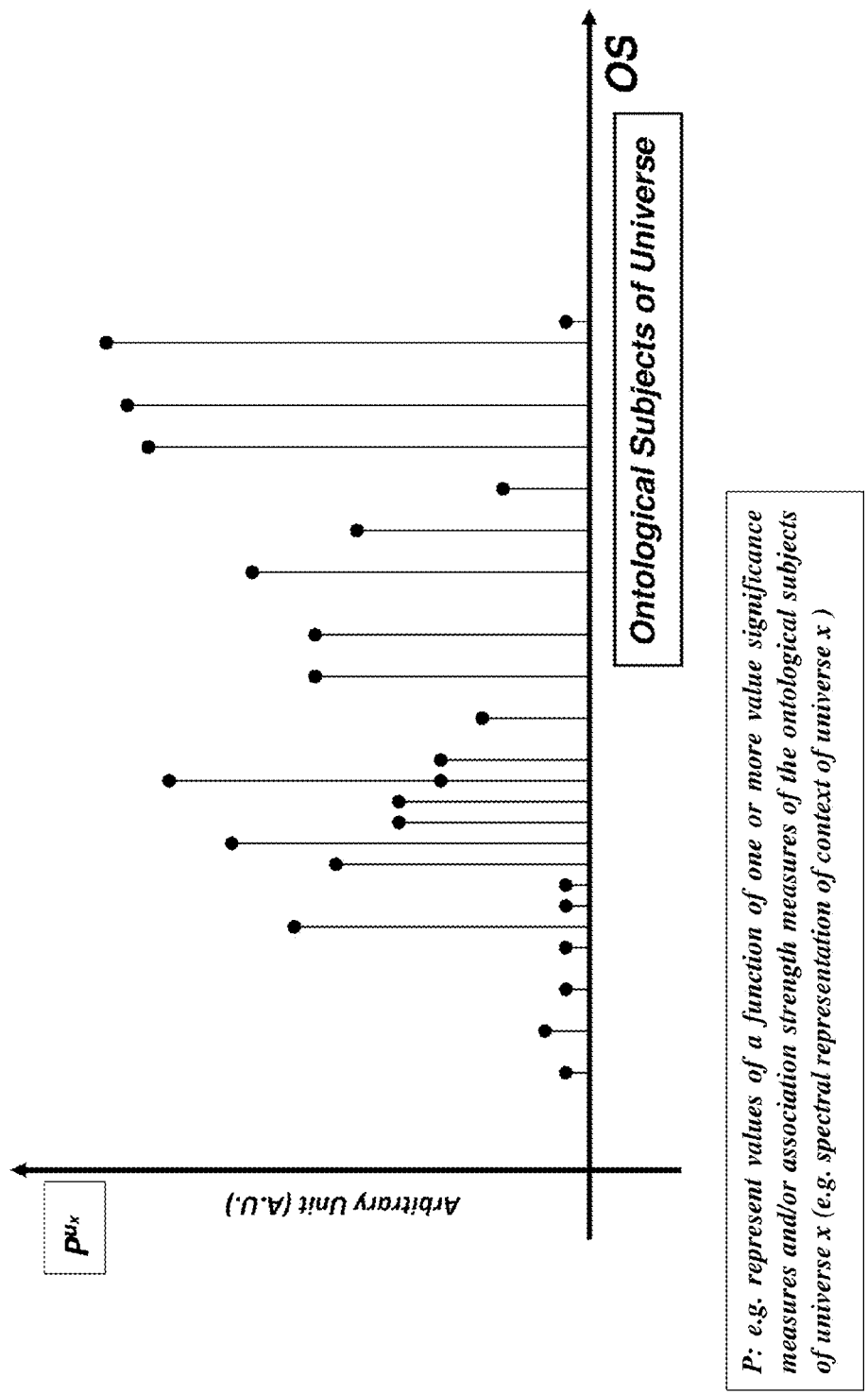
FIG. 5: is an exemplary representation of Ontological Subject (OS) spectrum of a universe x versus its constituent OSs.

Furthermore spectrums and its corresponding data structure can be formed for the composition, or a universe versus the value significance measure values of its constituent ontological subjects as shown in FIG. 5.

Also from an OSM we can also derive and calculate to obtain value-significance-measure's values of the ontological subjects of the universe if, in one embodiment of the present invention, we consider the relation between the nodes as a type of positive or negative contribution to said measure of importance of an ontological subject relationship and therefore a node has a positive or negative contribution which is coming from its associated set of nodes in the OSM. If we regard the association value as amplitude then we can calculate the overall importance measure of each OS versus its associated OS as:

$$P_i = P(OS_i) = \Sigma_{j=1}^{N} g_{i,j}(m_{i,j}) P_j \quad (12)$$

wherein g is a predefined function and in this embodiment or more straight forwardly a filtered copy of an ASM (the filter is predefined such the by the exemplary examples given for building an OSM).

The adjacency list of each OS, i.e. each row of the adjacency matrix M or G, can be viewed as the spectrum or ontological subject spectrum of each OS versus its associated set of OSs. The spectrums of the ontological subjects then can be used for quick comparison of different composition to each other and/or to a reference OSM.

Referring to FIG. 5 now, the stationary OS value significance vector is shown as a discrete spectrum for an exemplary universe of a composition called $u_x$. FIG. 6 shows the value significance spectrum of the ith ontological subject of an exemplary universe called u1, i.e. $P_i^{u1}$. As seen in FIG. 6, the value significance measure value of an individual ontological subject can be expanded versus the value significance values of its associated set of OSs. As mentioned before the associated set is in fact the adjacency list of each OS in the OSM (or an ASM) and their amplitude or associated power are the nonzero elements of the ith row of the matrix M or G.

Examplary Uses of OSMs for Comparison and Merit Measurement

One of the motives and application of the method and system of the invention is to use the method and system to compare compositions against each other and/or a larger composition and/or a collection of compositions. In doing so, two approaches may be employed alternatively or both at the same time.

One, or the first, approach, which is in fact a special case of the other approach, is to extract the ontological subject set of a first composition, e.g. called $OS_{u1}$, and build the co-occurrence matrix in u1 for that set, and uses the same set to build the co-occurrence matrix in the partitioned compositions of universe 2, u2.

Figure 7:
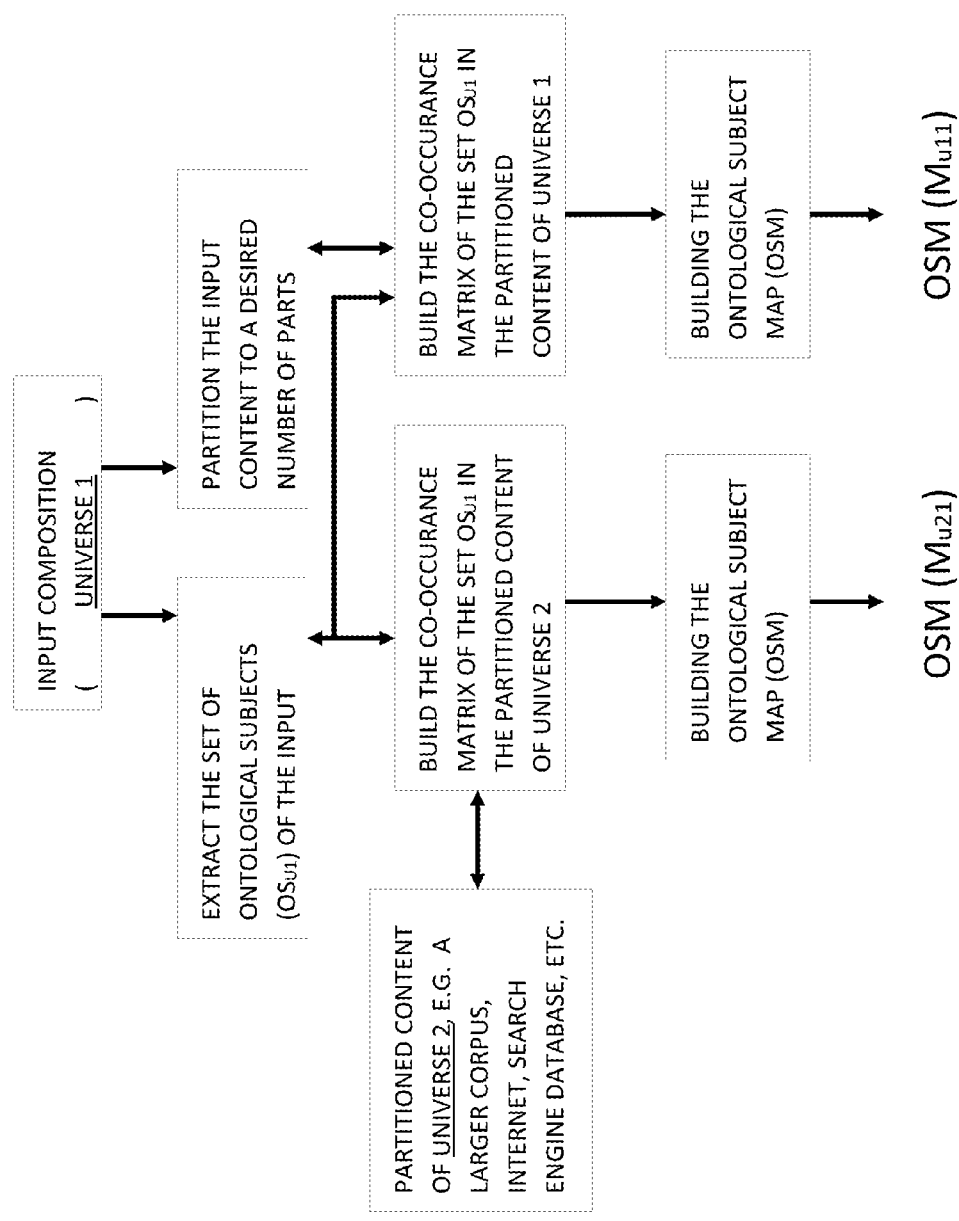
FIG. 7: is a flow diagram of constructing OSMs of a composition in the context of universe 1 and universe 2.

FIG. 7 shows one embodiment of implementing the OSM for two universes to be used for comparison, ranking, merit valuation and other applications. In FIG. 7 the ontological subject set of first composition, $OS_{u1}$, is extracted and used for constructing the co-occurrence matrix C from the u1, while we also construct co-occurrence of the same set, in the universe 2, u2, and consequently build the corresponding OSM for u1 and u2, i.e. $OSM_{u11}$ and $OSM_{u21}$ in FIG. 7.

The universe 2 could be simply another composition or could be a larger universe with more partitioned compositions, such as a collection of compositions, a corpus, or a collection of related compositions obtained from the internet using search engines, etc. In one important case the universe 2 is the repository of the whole internet which in that case the universe 2 is close to our real universe.

Commercial or in house search engine databases can be used to get the co-occurrences counts of each two OSs from the internet. When using internet and search engine, building a co-occurrence matrix could involve simply the "Boolean AND" search for each two OSs and looking at the hit counts. When the number of partitions or the compositions found in the internet, containing both OSs, is large enough, which is usually the case, the hit number is a good approximation of co-occurrence of each two OS in our universe. However for a more certainty in constructing co-occurrence matrix one may chose to download a plurality of composition form the internet and construct the co-occurrence matrix of $OS_{u1}$ in that collection of compositions which form the universe 2, u2. Using the teachings of the present invention we can then build two OSMs for the ontological subjects derived from u1. One of the OSM is build from the composition of u1 and another is build from composition of another universe say u2. The resulting OSMs denoted as $OSM_{u11}$ and $OSM_{u21}$ respectively as shown in FIG. 7.

Figure 8:
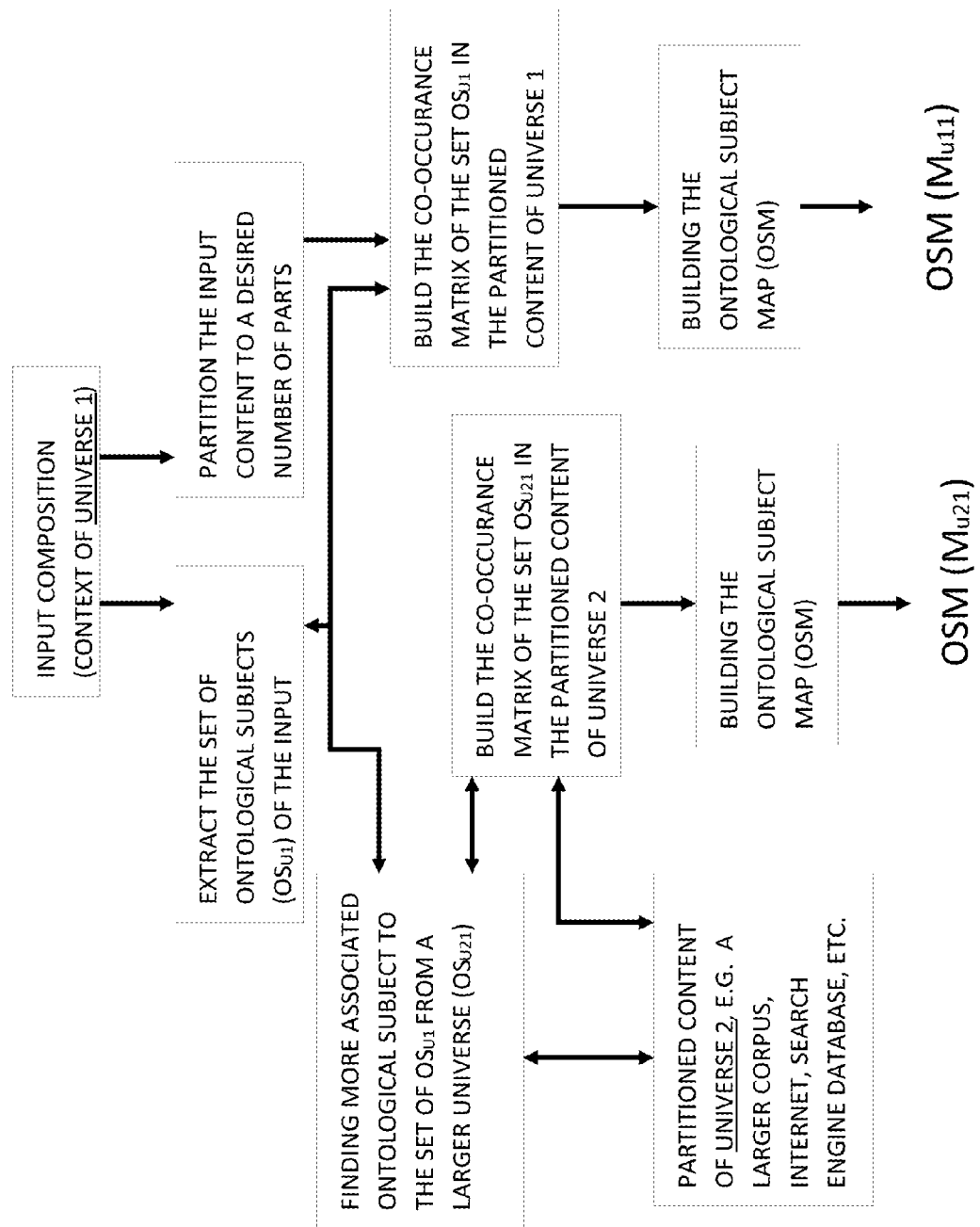
FIG. 8: is another flow diagram of constructing OSMs of a composition in the context of universe 1 and universe 2, wherein more associated OS has been added to the OSs of the input composition.

The other approach is to expand the number of OSs beyond the set of $OS_{u1}$. FIG. 8 shows that in this embodiment the extracted set of OS from u1, i.e. $OS_{u1}$, is used to construct $OSM_{u11}$, while by retrieving or obtaining more compositions containing one or more members of $OS_{u1}$, more associated OSs is extracted from those compositions and a desired number of total OS is selected, which is denoted by $OS_{u21}$ in FIG. 8. We then build the co-occurrence matrix C for the extended set of $OS_{u21}$ in the universe 2 and build the corresponding OSM as denoted in FIG. 8 by $OSM_{u21}$.

To find more compositions containing one or more members of $OS_{u1}$ we can use internet and search engine, or we can search in a premade database of composition such as large corpuses or collections of diverse compositions. Also, for instance, to find more associated OS for $OS_{u1}$ and expand the spectrum, we can use the strongest OSs in universe 1, derived from $OSM_{u11}$, and then search in the internet to get more related compositions from which more associated ontological subjects can be extracted.

Usually one of the universes (often the larger one) is used as the reference universe. The larger universe refers to a universe which has a higher number of ontological subjects, i.e. more knowable objects or subjects. The dimension of the OSM or the resulting matrix M or G is determined by the number of OSs from the larger universe. Hence the matrixes M and G for $OSM_{u11}$ and $OSM_{u21}$, and their corresponding stationary vector $P^{u11}$ and $P^{u21}$ will have the same dimension.

Figures 9A, 9B:
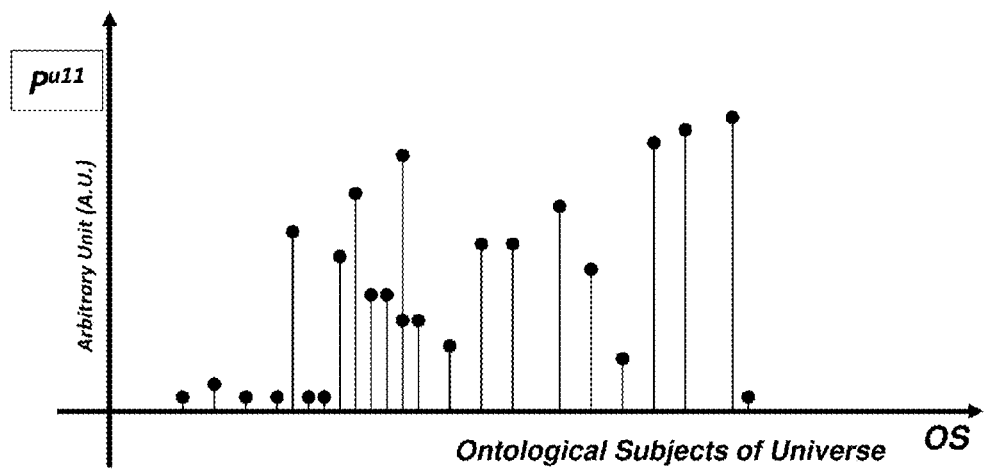
FIGS. 9a and 9b: a spectral illustration of two OSMs, one derived from the content and context of universe 1 and another from the content and contexts of universe 2.

FIGS. 9a, and 9b, show the spectrums of stationary power vectors versus their constituent ontological subjects derived from universe 1 and 2. For example FIG. 9a shows the OS spectrum of $OS_{u1}$ derived from content of universe 1, $P^{u11}$ and FIG. 9b shows the OS spectrum of $OS_{u1}$ derived from the contents of universe 2, $P^{u21}$. It is seen that, the first approach is, in fact, a special case of the second approach in which the set of $OS_{u21}$ is the same as set of $OS_{u1}$. Therefore FIGS. 9a and 9b can be used to represent both approaches.

The co-occurrence matrix of the universe with lesser number of OS, will have zero co-occurrence for those OS that do not exist in that universe. For comparison application, the OS axis covers (e.g. have the same dimension as) the larger universe OS members. In one particular, but important case, the OS axis could be universal and containing the largest possible number of OS (all the OSs that have existed or known to the present time).

Referring to FIGS. 9a and 9b again, as seen the stationary power spectrums obtained from the content of universe 1 and universe 2 can be different. Apparently the corresponding matrixes, e.g. C, M, and G can also be essentially different. The differences convey important information about the validity, authoritativeness, novelty and generally the merits of a composition in larger contexts.

Figure 10:
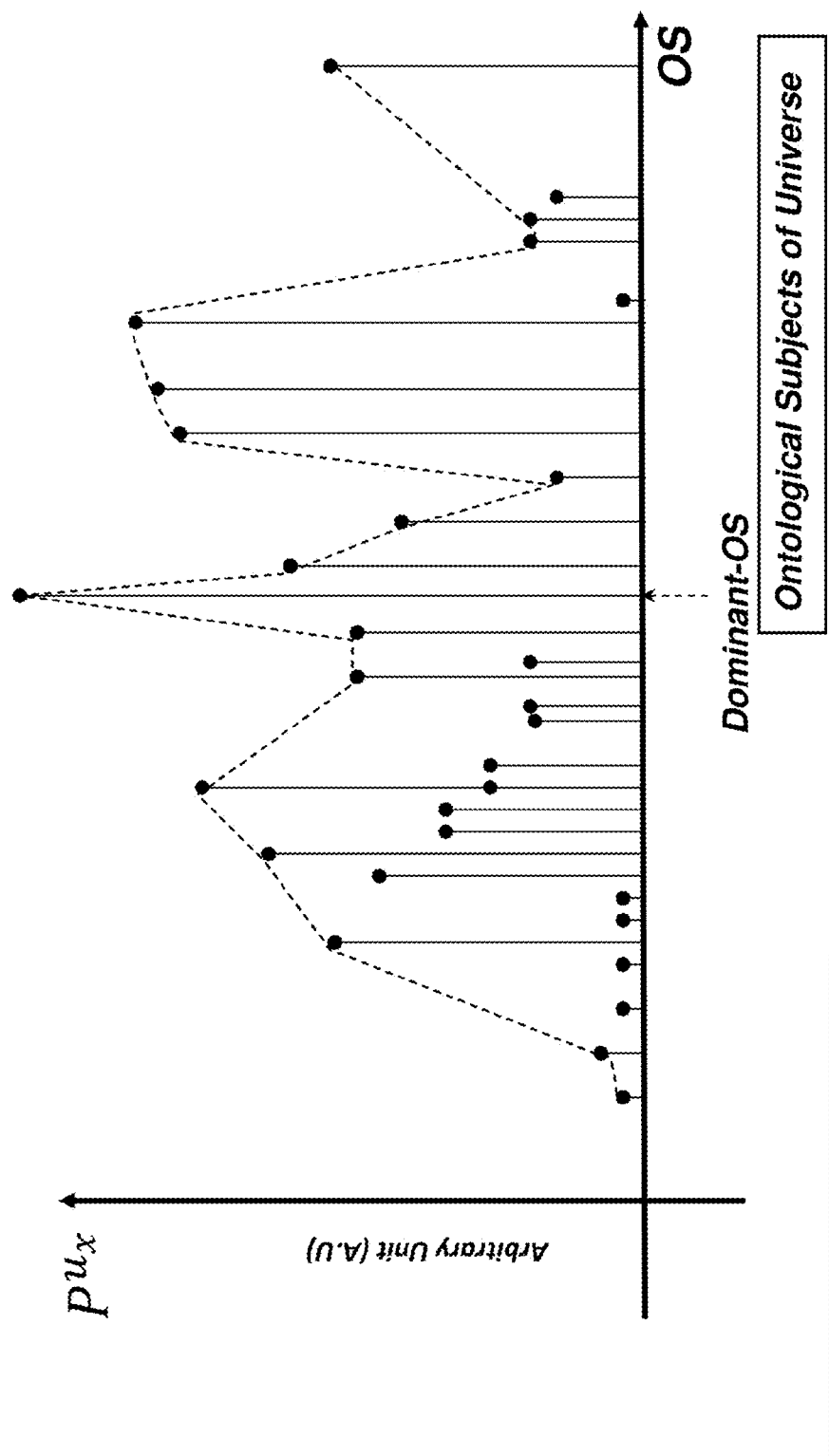
FIG. 10: an illustration of Ontological Subject spectrum of a universe x wherein the dominant OSs have been identified and the resulting spectral envelope is used as the summary or as the characteristic signature of the composition x.

FIG. 10 shows that a composition can also be identified with its dominant OSs using the resulting envelop spectrum by filtering out less powerful OS components. Those OSs components with less power than a predetermined threshold value might be treated as noises in some applications. Discrete Fourier transformation techniques may be employed for the OS power spectrum for variety of processing such as filtering and summarization as well as novelty detection, knowledge discovery etc.

Now consider that we want to analyze and asses a composition of universe 1 ($u_1$) in the context of a reference universe 2 ($u_2$). That is to use the ontological subjects of $u_1$ to construct the co-occurrence matrix in both universes. We can, then, build the OSM for each of the universes and construct the matrix M or G and consequently the power vector P for each universe. We now introduce few exemplary measures of merit for a composition of u1, in the context of a reference universe 2, u2. For example one measure of merit or merit parameter can be defined as:

$$mp_1 = \frac{p^{u11} \cdot p^{u21}}{\|p^{u11}\| \cdot \|p^{u21}\|} \qquad (13)$$

where $mp_1$ is the merit parameter 1, and $\|\ \|$ in the norm of a vector. This merit measure is in fact a measure of correctness and substance of the composition of u1 in the context of reference u2. This measure can be readily used for ranking contents, e.g. ranking the contents of web pages or ranking documents in a collection of documents, etc. As seen by those skilled in the art one of the advantages of the power spectrum notion of compositions is the ability to use the well known method of spectral analysis and signal processing in dealing with text compositions or generally content analysis.

The association value matrix A and/or the adjacency matrix M and/or the power matrix G also convey interesting and important information about the content of composition of u1. For instance, another useful set of data related to measures of merit of a composition in the context of the reference universe u2, are obtained by the differential power matrix which is defined as:

$$G^d = [G_{u1} - G_{u2}]. \qquad (14)$$

wherein $G^d$ is the differential value/power matrix which contains interesting and valuable information about authoritativeness, novelty and/or substance of a composition compared with a reference universe of u1.

The matrix $G^d$ can be represented visually by using, for example, mesh or counter plot from MATLAB$^R$ software or any other desirable tools and methods. When the matrix $G^d$ is represented visually, interesting features of the composition of u1 in the context of u2 can be seen. For example when there is a perfect match then the $G^d = 0$ and no bump or intensity difference in the mesh or plot can be seen. However, when $G^d \neq 0$ the mesh or plot can show the location and intensity of differences visually, and guide a user to look into these areas for further analysis and investigation. Therefore $G^d$ can point to novelty, new knowledge, or flaws in the composition.

When the reference universe is large enough, the reference universe can be viewed as the contemporary collective knowledge of people as whole or a large group of people expert in a domain of knowledge. For instance, the sum of all rows or columns of the differential matrix, $G^d$, is an indication of magnitude of general deviation of a composition from the status quo knowledge or collective understanding of the present time about a subject. Alternatively a sum over a row or a column of the differential matrix, $G^d$, is a measure of local differences and deviation of power and emphasis of each OS, used in the composition, from the collective wisdom or collective knowledge of people about that OS.

Depends on the application, more sophisticated or detailed analysis can be introduced or used without departing from the scope and spirit of the invention. For example one may define another measure of merit or merit parameter as follow:

$$mp_2 = \frac{\sum_j \sum_i \left( m_{i,j}^{u11} \sqrt{p_i^{u11}} - m_{i,j}^{u21} \sqrt{p_i^{u21}} \right)^2}{\|p^{u11}\| \cdot \|p^{u21}\|} \qquad (15)$$

where $mp_2$ is the second exemplary merit parameter, $P^{u11}$ and $P^{u21}$ are the value/power vector of the universe 1 and 2 respectively, $p_i^{u11}$ and $p_i^{u21}$ are the power of OS derived from $OSM_{u11}$, and $OSM_{u21}$ respectively, and $m_{i,j}^{u11}$ and $m_{i,j}^{u21}$ are the elements of the matrix M corresponding to $OSM_{u11}$, and $OSM_{u21}$ respectively. Here $mp_2 \geq 0$ and may be a more accurate measure of similarity and substance than $mp_1$.

Alternative Uses/Interpretations of Association Spectrums/Matrices and More Merit Measures More quantitative measures or alternative formulation is possible to envision with minor differences from the method presented in this invention which was explained by the exemplary embodiments.

For instance an OSM (e.g. FIG. 3) or a network representing any type of the ASM matrixes can be viewed as a neural network with the weight between input/output nodes of such neural network are given by the association strength value of ontological subjects wherein eth nodes are representative ontological subjects in such an artificial neural network. Such a network can be trained (e.g. the weight between the nodes be updated) by updating the ASM. Updating an ASM can be done by modifying (e.g. adding or omitting content) the input composition from which the ASM is derived following the teachings of the present disclosure as well the incorporated references herein. The training can be supervised or unsupervised with minor efforts. For instance, as pointed out in several places in this application, the systems of current disclosure do add or alter the initial data (i.e. the input compositions) that they use to generate the other data (to generate ASM or VSMs. etc. or additional data) or the input is provided or controlled by a client so that the resulting data objects of the current disclosure will be altered or updated, i.e. trained.

The function g in equation (11) can be defined linearly so the elements of matrix G are linear functions of elements of matrix M. In one special case G can be the same as matrix M. Furthermore instead of M, the adjacency matrix of the OSM, one can also use the co-occurrence COM or ASM matrix or column-normalized association matrix ASM in equation (6) to (9), to derive another set of similar formulations, or use a different view or interpretation of the OS spectrums of universes. Other types of OS value/power/association spectrums or additional calculable parameters and data can also be generated and used, for more comprehensive analysis of compositions and knowledge processing applications. Those skilled in the art can alter the formulations without departing from the scope and spirit of the present invention.

Merit measures also can be viewed as the outputs of a single or multi-layer neural networks. Once more data is fed back to such system as the whole the neural net will be trained and can enhance its performance by learning continues by being fed with more (or less) number of compositions.

Examplary Applications

The method is based on intrinsic value of subjects in a universal context and therefore a better platform for comparison, ranking, and retrieval applications for the compositions. Therefore, in below few exemplary and non-comprehensive applications of the present invention are given.

1) Classification, indexing and ranking documents: find the principle OS (the strongest OS) for each documents, classify and index them under their principle OS; and, using the same reference universe, rank them in a classified list based on the value of one or more of the merit parameters. Furthermore, the classes can also be ranked according to their OS power in the universal context. Apparently a composition can be listed under different classification and have different rank for different classes or categorizations, i.e. for different OSs. Ranking new or existing contents based on their intrinsic value or power has applications in information and knowledge retrieval such as web page ranking for search engines.

2) The OSM map uniquely positions the ontological subject in a map based on its importance and power. The map is very instrumental in knowledge exploration and guiding searchers and researchers for more efficient way of finding a solution for a challenging problem of intrinsic importance. Additionally, a system having premade OSMs databases or real time OSM building capability can present a road map to a user graphically or suggesting a research trajectory for exploration of a subject matter thereby increasing the user efficiency in learning, discovery and production of more valuable compositions. The map can also be used to zoom in to show a detailed association of an OS with less powerful or important OSs (micro view), or zoom out to see the position of an OS in the universal scale OS map (bigger picture view). Moreover, a content creator can quickly and conveniently assess his created composition and benefit from the instant feedback from the system to learn about the weakness and strength of her/his composition.

3) Measuring the merit of newly composed contents is another important application for timely publication of important contents. Few applications of OSM in the area of publishing have been discussed in the US patent application entitled "Assisted Knowledge Discovery and Publication System and Method", filed on Jul. 24, 2008, application number of Ser. No. 12/179,363, by the same applicant. The mentioned disclosure use OSM for systematic knowledge discovery and publication of valuable contents either scientific or artistic by comparing and ranking documents and giving feedback to referees and creators systematically.

4) Summarizations and reporting: the OSM method and system and the analysis presented in this invention can be used for summarization purposes. For example, one can select the highest power OS of the composition and for one or few of the highest power OS (the lead or anchor OSs) look for the specifically expressed statements that contain both terms and should be selected to be used n the summary of the composition. As mentioned before, FIG. 10 shows an illustration of OS spectrum of a universe of the composition x wherein the dominant OSs have been identifies or hunted wherein the resulting envelope can be used as the summary, snapshot, and concise characteristic signature of the composition x. Providing a summary from the OS spectrum envelop should be straight forward since in the process of building the OSM and calculating the stationery power vector of OSs we have had built the participation matrix PM (see (1)) so we can quickly select the most important partitions of the composition, from (1), containing the most important OSs.

5) Filtering and distillation of compositions: the method is similar to summarization but with the option to verify the summary statements in a larger contexts and larger universe by statistically verifying the trueness of the statement used in the composition of the universe. Moreover using Fourier transformation techniques the OS spectrum can be filtered automatically to keep the dominant OSs for consecutive knowledge processing operations.

6) Ontology building: using the map and the adjacency matrix of the map to fill ontologies by selecting an OS, or two or more associated OSs, from the OSM and searching in the internet, or looking into the participation matrix, or any other corpus for explicitly expressed relations of one, two or more OS and verifying the trueness of the statements statistically.

7) Question answering applications: The system and method can be used to find, in real time, valid and verified answers of intrinsic importance to a question. Moreover, one can use pre-built ontologies, mentioned in previous exemplary application, for question answering applications.

8) Contract researching: an small entity can use the method and system to perform professional research for a third party at higher speed and with more substantial results.

9) Personal and individual users can use software, developed based on the method of the present invention, to train them over the internet or private networks employing personal computers or personal consuls.

10) Educational institutes or research centers can use the method and system of the present invention to train and educate their staff, students, and clients more efficiently. The student essays, papers, and scientific contribution can be scored by composition analysis engine using the method and teaching of the present invention.

11) Business applications: the system and method can be used for competitive analysis of business proposals, intellectual properties, marketing researches, financial analysis, market trend forecasts, and the like, in terms of their validity, substance, competitive advantages, and novelty. The system and method can be used for intrinsic merit evaluation of business proposals and impact estimation of a business venture.

12) Training a neural network: in artificial neural networks usually there is node with several other nodes connected to them each having a certain impact weight for a neuron to fire so that to be used for comparison, inferences or neural based deep learning. Having a correct or justified weight is of vital importance for the performance of a neural networking system and its convergence and the quality of its function. By the same methods and approaches given in this disclosure one can use the association strengths (or the association spectrum vector) which is obtained (i.e. learned) by the investigation method of composition given in this disclosure, to have the necessary and justified weight of the connecting components (e.g. the inputs nodes for each node) of the nodes of the network.

Premade and Universal OSM Embodiments

Figure 11:
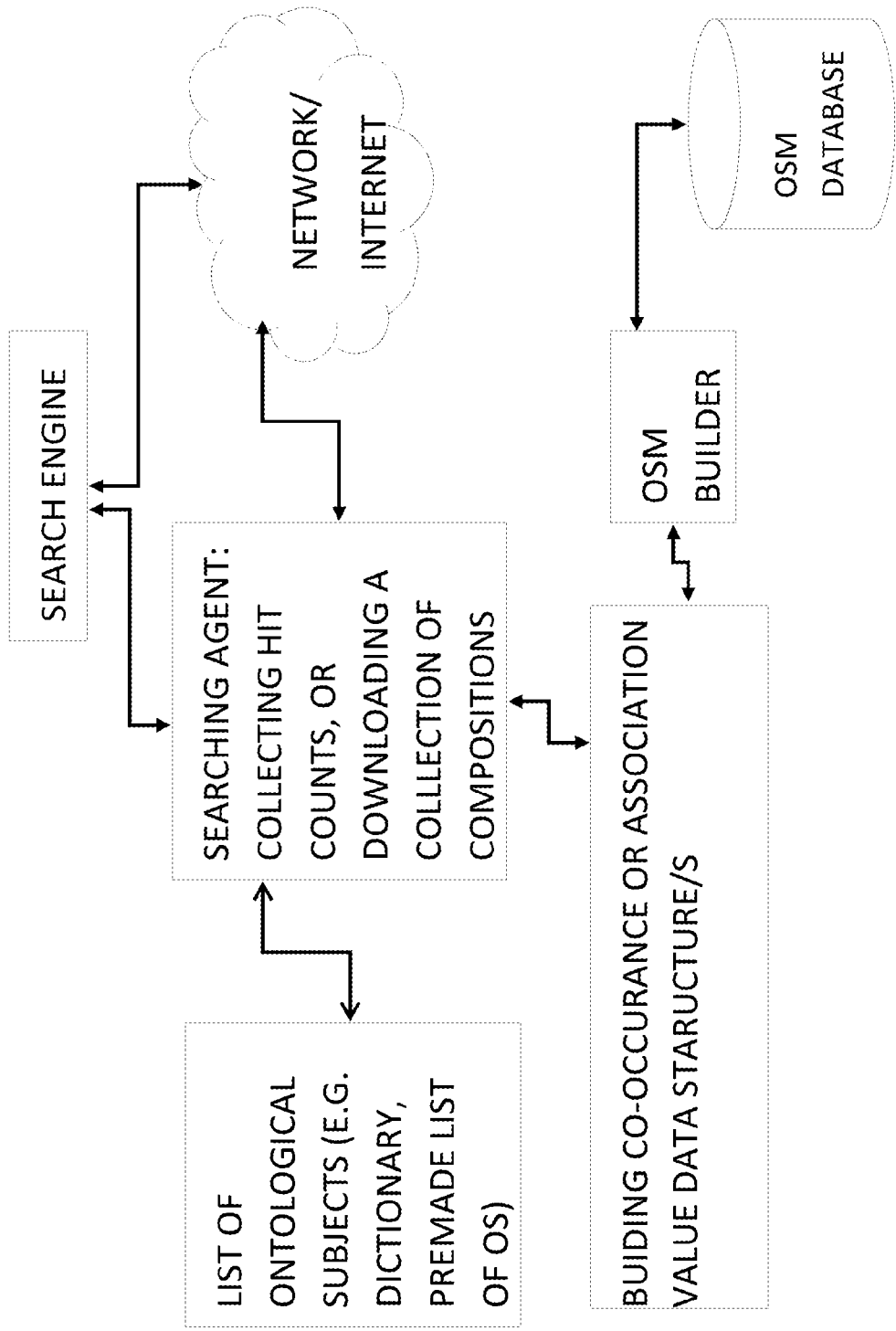
FIG. 11: schematic view of the system and method of building an OSM using search engine and internet and premade list of ontological subjects.

In many applications it is faster and advantageous to have premade OSMs to be used as references for different compositions. FIG. 11 shows schematic view of one exemplary embodiment of the basic processing blocks of a system and method of building an OSM using search engine and internet and premade list of ontological subjects. In this embodiment we use a list of ontological subjects that have been already assembled or extracted from the compositions or any other ready to use list of OSs. The premade list is fed to a searching agent that has access to a search engine data base. The role of searching agent is to find the co-occurrence information of each two OS in the internet or a search engine database, or if desired or appropriate finding and retrieving, a desired number of related compositions to the fed OS. Then the co-occurrence builder estimate and builds the co-occurrence matrix using the information that is provided by the searching agent, e.g. hit counts, or alternatively build the co-occurrence matrix by processing the retrieved compositions by the searching agent, using the described methods of present invention. After the co-occurrence matrix was build, and/or association strength/values are built, another block or piece of computer program builds the OSM using the algorithm of the present invention. The resulting OSM is then indexed in a database or respective data structures by an OSM builder/indexer (not shown in the FIG. 11).

It should be noticed that in this embodiment the universe contains all the compositions that exist in the internet and therefore the resulting premade OSMs are indicatives of general understanding or distilled state of knowledge about the ontological subjects. When the input list of OS is already classified and contains a group of related OSs, the resulting OSM can also be categorized under the same classifications. Therefore we can have specific premade OSMs for different classes or related OSs. However, when the input OS list is general and large enough, the resulting OSM is also general. The larger the list of input OS, the broader the extent of OSM would be and the closer the OSM would become to underlying realties of the universe. One should expect to have good true knowledge of our universe when the input list of OS contains all existing and conceivable ontological subjects of the world in its largest extent. In this case the resulting OSM is universal and very close to true realties of our universe. A universal OSM can be very instrumental in new knowledge discovery, since the connection of everything in the universe to everything else in the universe is established and revealed.

Application Systems

Many system configurations can be proposed to implement the method and teachings of the present invention that provide a service to users for one or more of the mentioned exemplary applications or many other that were not listed.

For example, according to one embodiment, the computing system that is used to implement the method/s and teachings of the present invention comprises storage devices with more than 1 (one) Giga Byte of RAM capacity and the processing device or units (i.e. data processing or computing devices, e.g. the silicon based microprocessor, quantum computers etc.) that can operate with clock speeds of higher than 1 (one) Giga Hertz or with compound processing speeds of equivalent of one thousand million or larger than one thousand million instructions per second, or speed of instruction-per- second/megahertz-of-clock of 2 or higher (e.g. an Intel Pentium 3, Dual core, i3, i5, i7, and Xeon series processors or equivalents or similar from other vendors, or equivalent processing power from other processing devices such as quantum computers) are used to perform and execute the method once they have been programmed by computer readable instruction/codes/languages or signals and instructed by the executable instructions.

Additionally, for instance according to another embodiment of the invention, the computing or executing system includes or has processing device/s such as graphical processing units for visual computations that are for instance, capable of rendering and demonstrating the graphs/maps of the present invention on a display (e.g. LED displays and TV, projectors, LCD, touch screen mobile and tablets displays, laser projectors, gesture detecting monitors/displays, and the like from various vendors, such as Apple, Samsung, Sony, or the like etc.) with good quality (e.g. using a NVidia graphical processing units). Also the methods, teachings and the application programs of the presents invention can be implement by shared resources such as virtualized machines and servers (e.g. VMware virtual machines, Amazon Elastic Beanstalk, e.g. Amazon EC2 and storages, e.g. Amazon S3, and the like etc.

Alternatively specialized processing and storage units (e.g. Application Specific Integrated Circuits ASICs, field programmable gate arrays (FPGAs) and the like) can be made and used in the computing system to enhance the performance and the speed and security of the computing system of performing the methods and application of the present invention.

Moreover several of such computing systems can be run under a cluster, network, cloud, mesh or grid configuration connected to each other by communication ports and data transfers apparatuses such as switches, data servers, load balancers, gateways, modems, internet ports, databases servers, graphical processing units, storage area networks (SANs) and the like etc."

Client server system architecture over networks and internet is well known so that we do not show the exemplary computer architecture and network topology of such client server systems. Accordingly, in FIG. 12-18 only the basic blocks of the service and the related functions and analytical engines are given for handling three of such request for service applications.

Turning to FIG. 12-18 they depicts topologies of the systems using the data structures of the current disclosure to process the data or provide services. Topologies may include one or more data sources (e.g. one or more composition or data structure), information server, and client device. The elements depicted in one or more or of said topologies may be communicatively coupled to each other over network.

The Network may be a wired or wireless network such as the Internet, an intranet, a LAN, a WAN, a cellular network or another type of network. It will be understood that network may be a combination of multiple different kinds of wired or wireless networks.

Data sources may be computing devices, such as a hardware platform servers configured to receive and transmit information over network. Data sources may be configured to communicate to a third party services, if required.

Information server may be a computing device, such as a hardware platform server configured to support mobile applications, software, and the like executed on client computing device. Information server may include physical computing devices residing at a particular location or may be deployed in a cloud computing network environment. In these descriptions and the following claims, "cloud computing" may be defined as a model for enabling ubiquitous, convenient, on-demand network access to a shared pool of configurable computing resources (e.g., networks, servers, storage, applications, and services, e.g. Amazon EC2, S3 etc) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Information server may include any combination of one or more computer-usable or computer-readable media. For example, information server may include a computer-readable medium including one or more of a portable computer diskette, a hard disk magnetic or solid state or holographic or the like, a random access memory (RAM solid state based or optical) device, a read-only memory (ROM) device, an erasable programmable read-only memory (EPROM or Flash memory) device, a portable compact disc read-only memory (CDROM), an optical storage device, and a magnetic storage device.

In embodiments, information server may include a processing device, a communication device, a memory device, etc.

Processing device can include memory, e.g., read only memory (ROM) and random access memory (RAM), storing processor-executable instructions and one or more processors that execute the processor-executable instructions. In embodiments where processing device includes two or more processors, the processors may operate in a parallel or distributed manner. Processing device may execute an operating system of information server or software associated with other elements of information server.

Communication device may be a device that allows information server to communicate with another device over network. Communication device may include one or more wireless transceivers for performing wireless communication and/or one or more communication ports for performing wired communication. In embodiments, communication device may be configured to receive required data or a composition.

Memory device may be a device that stores data generated or received by information server. Memory device may include, but is not limited to a hard disc drive, an optical disc drive, and/or a flash memory drive. In embodiments, memory device may be configured to store information received from data sources and/or client device. The information stored within memory device may be accessed by other elements of information server. In embodiments, memory device may include a plurality of entries One or more hardware computing devices configured to do the matrix multiplications and transforming different data structures into each other.

A client can use or be a client device may be a smart phone, tablet computer, laptop computer, wearable computer, personal data assistant, or any other type of mobile device with a hardware processor that is configured to process instructions and connect to network, one or more portions of network. Client computing device may include processing device, communication device, graphical user interface (GUI).

Processing device may include memory, e.g., read only memory (ROM) and random access memory (RAM), storing processor-executable instructions and one or more processors that execute the processor-executable instructions. In embodiments where processing device includes two or more processors, the processors may operate in a parallel or distributed manner. Processing device may execute an operating system of client device or software associated with other elements of client device.

Communication device may be a device that allows client device to communicate with another device over network. Communication device may include one or more wireless transceivers for performing wireless communication and/or one or more communication ports for performing wired communication. In embodiments, communication device may be configured to transmit data associated with the client request o an OSM processing engine or to information server GUI may be a device that allows a user to interact with client device. While one GUI is shown, the term "graphical user interface" may include, but is not limited to being, a touch screen, a physical keyboard, a mouse, a camera, a video camera, a microphone, and/or a speaker. GUI may be configured to receive inputs for user or client request or information about the interactions with the GUI associated with the user. The client's data may be transmitted to information server over network.

Figure 12:
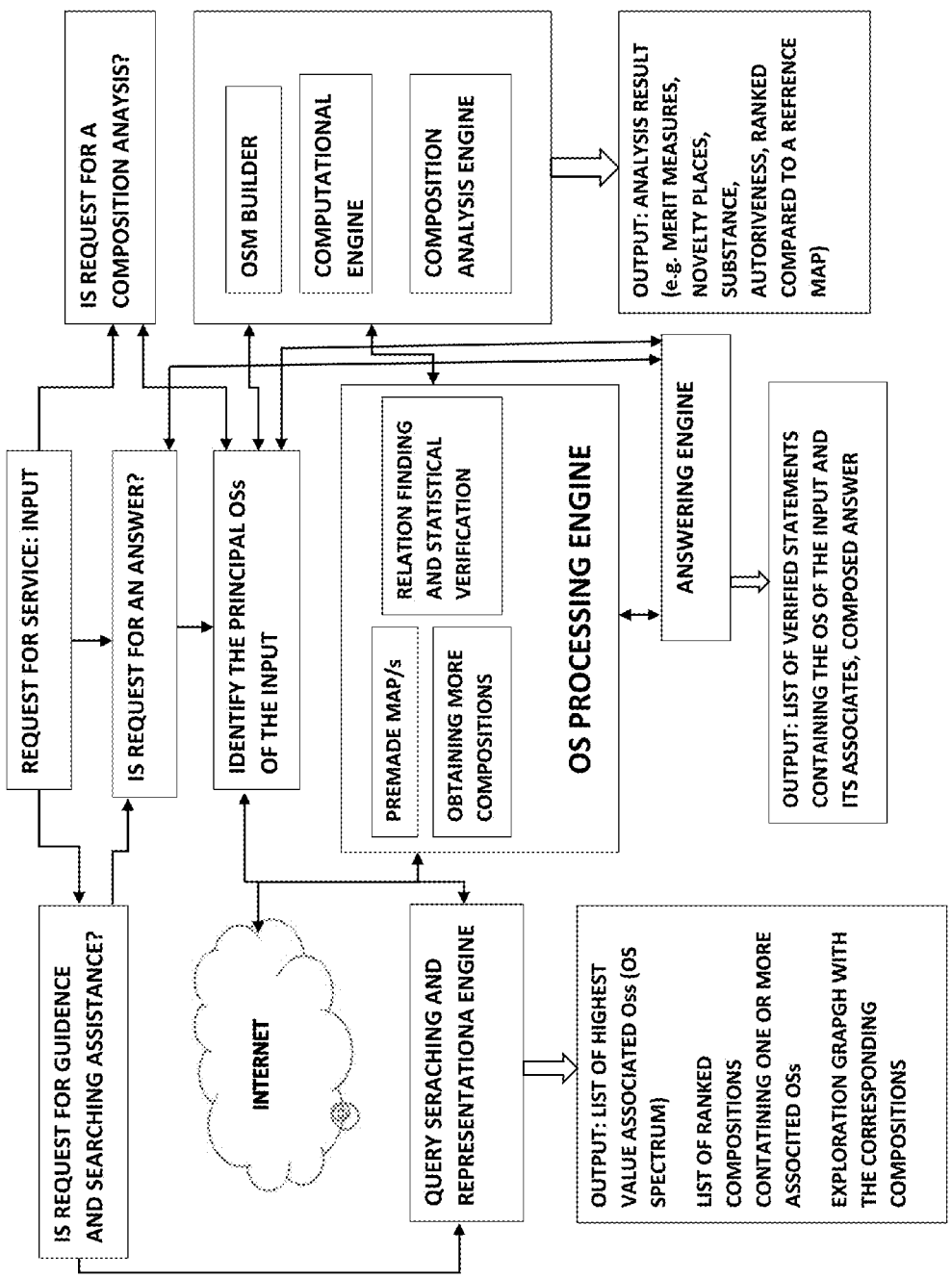
FIG. 12: shows a client server type system to fulfill requests of users for services such as composition analysis, search priority and research trajectory guidance, or distilled knowledge answering, according to one exemplary embodiment of the invention.

FIG. 12 shows one exemplary embodiment of a system of implementing few of the above applications for using as service by users and clients. As seen in FIG. 12: there is an OS Processing Engine (OSPE) that in conjunction with Application Engines (AE), e.g. Composition Analysis Engine (CAE), provide the requested services such as composition analysis, search priority and research trajectory guidance, or distilled knowledge answering, to the user. A user requests a service through network to the system. The system then provides the service by sending the outputs, in response of user's request, to the user. In this embodiment, the frond end interfaces are not shown. A person ordinary skilled in the art can readily envision and build a satisfactory interface that a user can interact with to request and get the service from the system of FIG. 12.

For instance, in this embodiment, a request could be a natural language question which needs one or several statements of the facts as the answer. Alternatively, a user might want to analyze a newly composed composition in the context of much larger reference universe, or a user simply would like to get guidance for researching about a subject matter. In this exemplary embodiment there are functional blocks that identify the type of service that user has requested, and then the request is passed to the principle OS identifier of input information attached to the request. The user provides some content with the request and therefore the rule of the principal OS identifier is to extract the main OS of the content accompanying the request.

Once the type of request was identified the request and its main OS/s get routed to corresponding application engine. The application engine then interacts and communicates with the OS Processing Engine (OSPE) to perform its task and provide the requested information to the user as the output. The outputs corresponding to each service, as expressed in the FIG. 12, is self-explanatory in the view of the present invention teachings.

The OS Processing Engine (OSPE) is responsible to provide the necessary information and processing functions that is requested by the application engine. The OS processing engine for instance provides the list of associated OS of input OS, either from premade OSMs or by obtaining the related compositions and finding the associated OSs with highest associated value. The OS Processing Engine (OSPE) is capable of building OSM for an input composition on demand. The OSPE will also be able to build an OSM from the repositories that contain a predetermined number of associated OSs to the main OS of the input. Moreover, it can also look for explicit relations between OSs from in house repositories or internet resources. Furthermore, it is capable of verifying the trueness of the statements by statistical analysis of the hunted statements containing one or more of the OSs.

As seen from the teachings of the present invention then it becomes readily straightforward to calculate the association and relevancy of each part of such a composition (such as the webpages or documents or their parts thereof) to each possible target OSs. These data are stored and therefore upon receiving a query (such as a keyword or a question in a natural language form, or in the form of a part of text etc.) the system will be able to retrieve the most relevant partitions (e.g. a sentence, and/or paragraph, and/or the webpage)

or compose the most sensible and informative content and present it to the user in a predetermined format and order.

Let's exemplify and explain this even in more detail here, when a service provider system such as a search engine, question answering or computer conversing, which comprises or having access to the system of FIG. 9, receives a query from a user, the system can simply parse the input query and extract all or some of the words of the input query (i.e. the OSs of order one) then by having calculated the associations strength of $rasm\_x^{1 \to 5|}$ one can easily calculate the association strength of each of the documents (e.g. wep-pages) to the words of the input query, and eventually the documents which have the overall acceptable association strength with the selected words of the input query will be presented to the queries as the most relevant document or content.

In another exemplary method of retrieval using this embodiment the most related document or partition to the input query are identified and retrieved or fetched as follow:
- extract the OSs (e.g. words) of the input query,
- obtain the $rasm\_x^{1 \to 1|}$ vector (e.g. the association strength of a words to each other obtained from the investigation of the crawled repository of webpages consisting one or more webpages/documents see Eqs. 27-30 of the U.S. patent application Ser. No. 13/608,333) for the input words of the query,
- make a common association strength spectrum or vector for the input words of the query by, for example, averaging the $rasm\_x^{1 \to 1|}$ vectors or multiplying them to each other,
- use the common association vector to identify the most related or associated documents, or sentences to the input query by multiplying the common association spectrum with the respective participation matrix (e.g. $PM^{15}$ for document retrieval and $PM^{12}$ for question answering or conversation as an example).

Moreover most of calculation can be done in advance and even for each target OSs (though not as a condition but usually the intrinsically significant OSs can be used as possible target) and therefore there could be assembled for each possible target OS a body of knowledge pre-made and pre categorized and ready for retrieval upon receiving a query by a system which has access to these data and materials. The degree of relevancy of such retrieved pages to the target OSs (e.g. the user's Queries) is semantically insured and the relevancy of such retrieved materials far exceeds the quality of the currently available search engines.

More importantly in a similar manner the engine can return for instance the document or the webpage that composed of the partitions of high novelty values, either intrinsic or relative, to the target OS/s. Therefore the engine can also filters out and present the documents or webpages that have most relevancy to the desired "significance aspect" based on the user preferences. So if novelty or credibility or information density of a document, in the context of a BOK, is important for the user then these services can readily be implemented in light of the teachings of the present invention.

Figure 13:
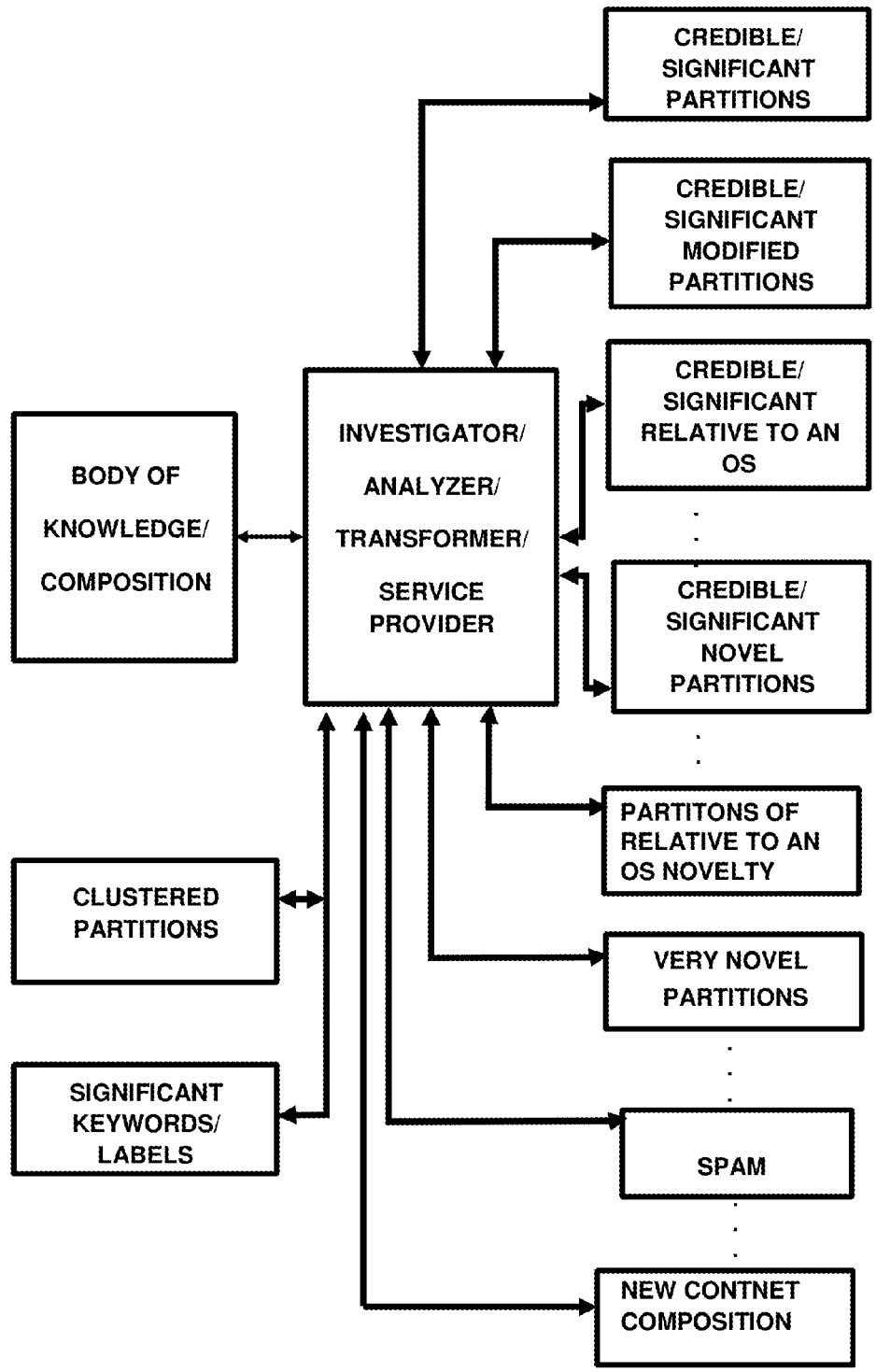
FIG. 13 is an exemplary system of investigating module/s for investigation of composition of ontological subjects providing one or more desired result/data/output according to one embodiment of the present invention.

Referring to FIG. 13 now, it shows schematically a system of composition investigations that can provide numerous useful data and information to a client or user as a service. Such output or services in principal can be endless once combined in various modes for different application. However in the FIG. 13 a few of the exemplary and important and desirable outputs are illustrated. The FIG. 13 illustrates a block diagram system composed of an investigator and/or analyzer and/or a transformer and/or a service provider that can receive or access a composition and provide a plurality of data or content as output. The investigator in fact implement at lease one of the algorithms of calculating one of the measures in order to assign a value on the part or partitions of the compositions and based on the assigned value process one or more of the partitions or OSs of the particular order as an output in the form of a service or data. The output could be simply one or more tags or OS/s that the input composition can be characterized with, i.e. significant keywords of the composition. In this instance, the significant keywords or labels are selected based on their values corresponding to at least one of the aspectual XY_VSM, i.e. one of the value significance measures.

As another example, the output or outcome of the investigator of FIG. 13, could be to provide the partitions of the input composition which have exhibited intrinsic value significances of above a predetermined threshold. Another output could be the novel parts or the OSs of the compositions that scored a predetermined level of a particular type of novelty value significance. Or the output could be the noisy part of a composition or a detected spam in a collection of compositions etc.

Several other output or services of the system of FIG. 13 are depicted in the FIG. 13 itself which are, in light of the foregoing, self-explanatory.

Figure 14:
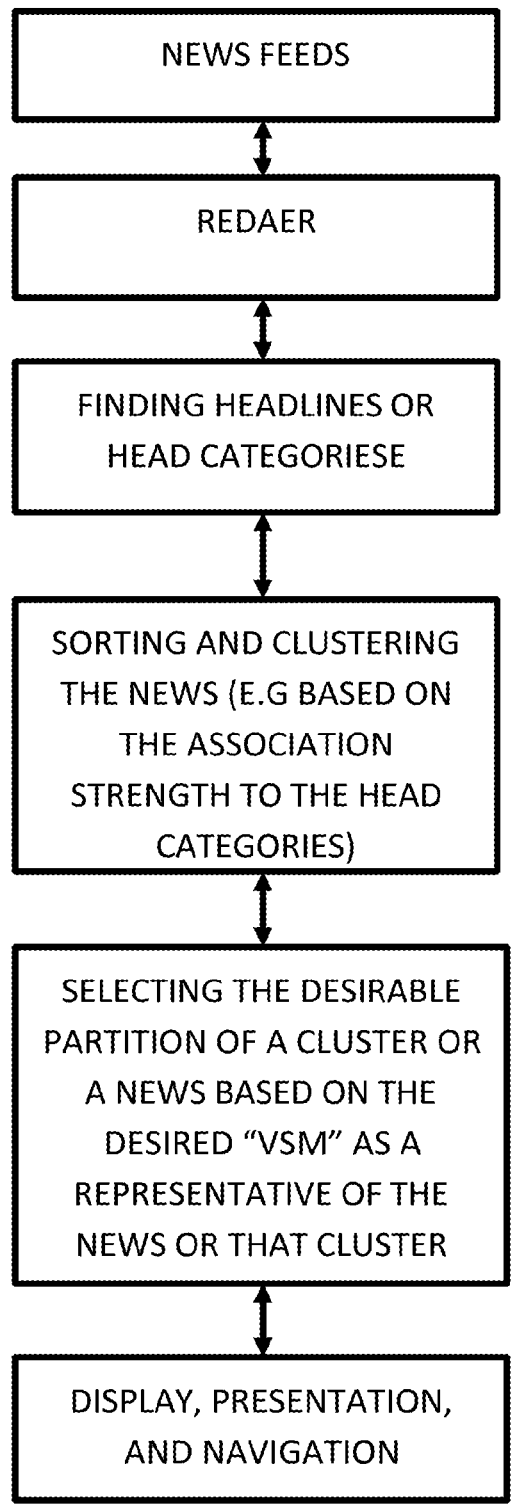
FIG. 14: is a block diagram of an exemplary application for investigation of a body of news feeds.

Referring to FIG. 14 now, it shows another instance and application of the present invention in which the process, methods, algorithms and formulations used to investigate a number of news feeds and/or news contents automatically and present the result to a client. In this exemplary but important application system, the news are being first categorized automatically through finding the significant head-categories and consequently clustering and bunching the news into or under such significant head-categories and then select one or more partitions of such cluster to represent the content of that clustered news to a reader. Head-categories can simply being identified, by evaluating at least one of the significance measures introduced in the present invention, from those OSs that have exhibited a predetermined level of significance. The predetermined level of significance can be set dynamically depends on the compositions of the input news.

It is important to notice that some of data in respect to any of these features (e.g. association of OSs) can be obtain from one composition (e.g. a good size of body knowledge) in order to be used in investigation of other compositions. For instance it is possible to calculate the universal association of the concepts by investigation the whole contents of Wikipedia (using, for instance, exemplary teachings of present invention) and use these data/knowledge about the association of concept in calculating a relatedness of OSs of another composition (e.g. a single or multiple documents, or a piece or a bunch of news etc.) to each other or to a query.

Moreover other complimentary representations, such as a navigable ontological subject map/s, can accurately being built and accompany the represented news. Various display method can be used to show the head-categories and their selected representative piece of news or part of the piece of the news so that make it easy to navigate and get the most important and valuable news content for the desired category. Moreover the categorization can be done in more than one steps wherein there could be a predetermined or automatic selection of major categories and then under each major category there could be one or more subcategories so that the news are highly relevant to the head category or the sub-categories or topics.

Furthermore many more forms of services can be performed automatically for this exemplary, but important, application such as identifying the most novel piece of the news or the most novel part of the news related to a head category or, as we labeled in this disclosure, to a target OS. Such services can periodically being updated to show the most updated significant and/or novel news content along with their automatic categorization label and/or navigation tools etc.

Figure 15:
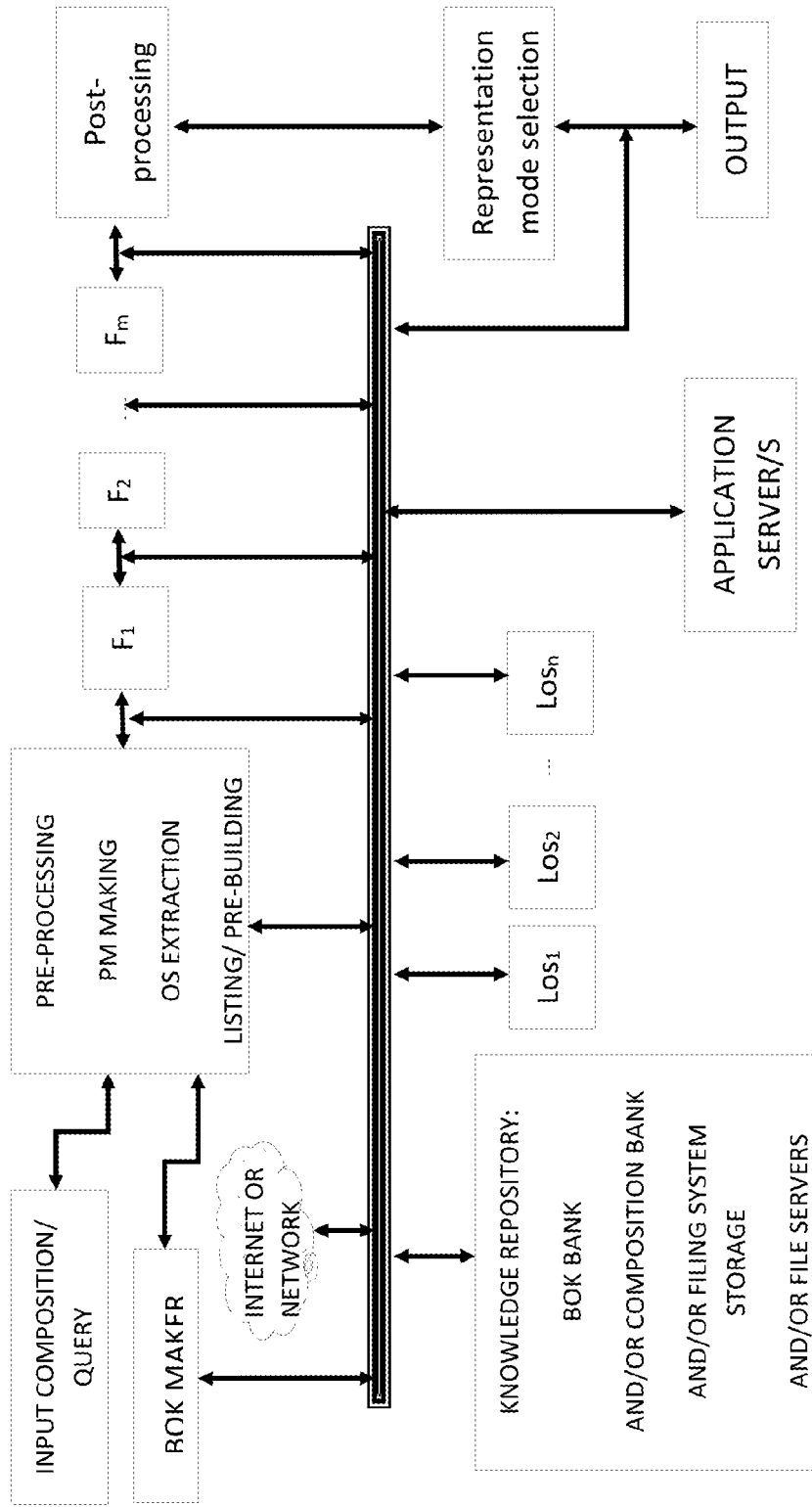
FIG. 15: is another exemplary general system of using the investigator providing various services to the clients over a communication network (e.g. a private or public) according to one embodiment of the present invention. This embodiment shows exemplary general architecture of a system in which one or more of the blocks are optional and can be omitted or one or more blocks can be added.

Referring to FIG. 15 now, it shows one general embodiment of a system implementing the process, methods and algorithms of the present invention to provide one or more services or output to the clients. This figure further illustrates the method that a particular output or service can in practice being implemented. The provider of the service or the outputs can basically utilizes various measures to select from or use the various measures to synthesize the desired sought after part/s of an input compositions. A feature to be noticed in this embodiment is that the system not only might accept an input composition for investigation but also have access to banks of BOKs if the service calls for additional resources related to the input composition or as result of input composition investigation and the mode of the service. Moreover as shown the exemplary embodiment of system of FIG. 15 has a BOK assembler that is able to assemble a BOK from various sources, such as internet or other repositories, in response to an input request and performs the methods of the present invention to provide an appropriate service or output data or content to one or more client. The filtration can be done is several parallel or tandem stages and the output could be provided after any number the step/s of filtrations. The filters $F_1, F_2, \ldots F_n$ can be one of the significance measures or any combinations of them so as to capture the sought after knowledge, information, data, partitions from the compositions. The output and the choice of the filter can be identified by the client or user as an option beside several defaults modes of the services of the system.

Another block in the FIG. 15 to mention is the post-processing block that in fact has the responsibility to transform the output of the filter/s into a predetermined format, or transform the output semantically, or basically composing a new composition as a presentable response to a client from the output/s of the filters of the FIG. 15. Also shown in this exemplary embodiment there is a representation mode selection that based on the selected service the output is tailored for that service and the client in terms of, for instance, transmission mode, web-interfacing style, frontend engineering and designs, etc.

Furthermore the exemplary system embodiment of FIG. 15 shows a network bus that facilitate the data exchange between the various parts of the system such as the BOK bank (e.g. containing file servers) and/or other storages (e.g. storages of $Los_1, Los_2, Los_3$, etc. and/or list storage/data wherein Los stands for List of the Ontological Subjects and, for instance, $Los_1$ refers to the list of the OSs of order 1) and/or the processing engine/s and/or application servers and/or the connection to internet and/or connection to other networks.

Figure 16:
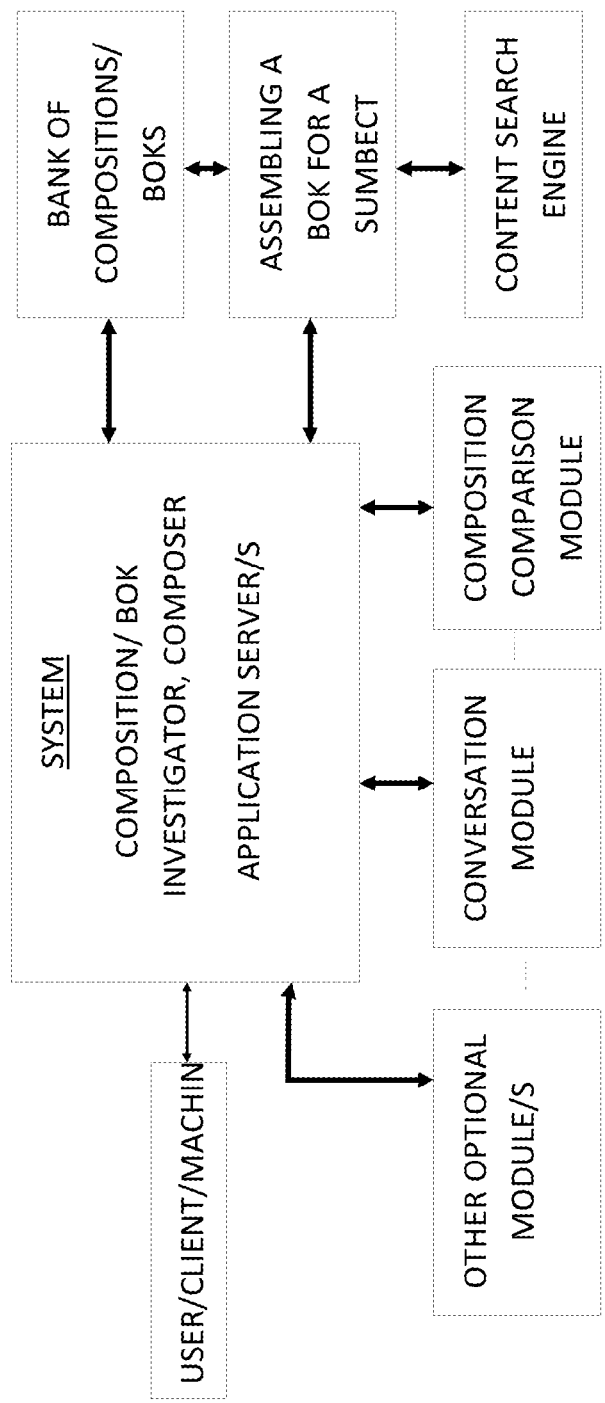
FIG. 16: is another exemplary block diagram of a composition investigation service for a client request for service according to one embodiment of the present invention. One or more functional modules can be still added to this embodiment and/or one or more of the modules can be removed or disabled.

FIG. 16 shows another general embodiment block diagram of a system providing at least one service to a client. In this figure there is a composition investigator wherein the investigator has access to a bank of bodies of knowledge or has access to one or modulus that can assemble a body of knowledge for client. Such said module can for example use search engines to assemble their BOK or from another repository or database. The system can also provide one or more of the services of the FIG. 13 to a client. For instance the system is connected to the client through communication means such as private or public data networks, wireless connection, internet and the like and either can receive a composition from the client or the system can assemble a composition or a body of knowledge for the client and/or the system can enrich or add materials to the client's input composition and perform the investigation and provide the result to the client. For example, by investigating the input composition from the client or user, the system can automatically identifies the related subject matters to the input composition and go on to assemble one or more BOK related to at least one of the dominant OSs of the input composition and offer further services or output such as the information regarding the degree of novelty of the input composition in comparison to one or more of said BOK/s and/or score the input composition in terms of credibility or overall score of the merits of the input compositions in comparison to the said BOK/s and/or identify the substantially valuable and/or novelty valuable part or partitions of the input composition back to the user or other clients or agents. In light of the disclosed algorithms and method/s of the composition investigation there could be provided a software/hardware module for composition comparisons that provide one or more of the services or the output data of the just exemplified application.

The mentioned exemplary application and service can, for instance, be of immense value to the content creators, genetic scientists, or editors and referees of scientific journals or in principal to any publishing/broadcasting shops such as printed or online publishing websites, online journals, online content sharing and the like.

Such a system can further provide, for instance, a web interface with required facilities for client's interaction/s with the system so as to send and receive the desired data and to select one or more desired services from the system.

Also as shown in the FIG. 16, other optional modulus can be made available to the client that uses the main composition investigator and or the BOK assembler or BOK banks. One of such optional modulus can be a module for client and computer or the client and system converse or conversation. The conversations is done in such a way that the system of this exemplary embodiment with the "converse module" receives an input from a client and identifies the main subject/s of the input and provide a related answer with the highest merit selected from its own bank of BOK/s or a particular BOK or an available composition. The response from the system to the client can be tuned in such a way to always provide a related content according to a predetermined particular aspect of the conversation. For example, the client might choose to receive only the content with highest novelty yet credibility value from the system. In this case the "converse module" and/or the investigator module will find the corresponding piece of content (employing one or more of the "XY value significant measure") from their repositories and provided to the user. Alternatively, for instance, the user can demand to receive the most significant yet credible piece of knowledge or content related to her/his/it's input. The client/system conversation, hence, can be continued. Such conversation method can be useful and instrumental for variety of reasons/applications such as entertainment, amusement, educational purpose, questions and answering, knowledge seeking, customer relationship management and help desk, automatic examination, artificial intelligence, and very many other purposes.

In light of the teaching of this disclosure, such exemplified modules and services can readily be implemented by those skilled in the art by, for instance, employing or synthesizing one or more the value significance measures, and the disclosed methods of investigation, filtration, and modification of composition or bodies of knowledge.

Figure 17:
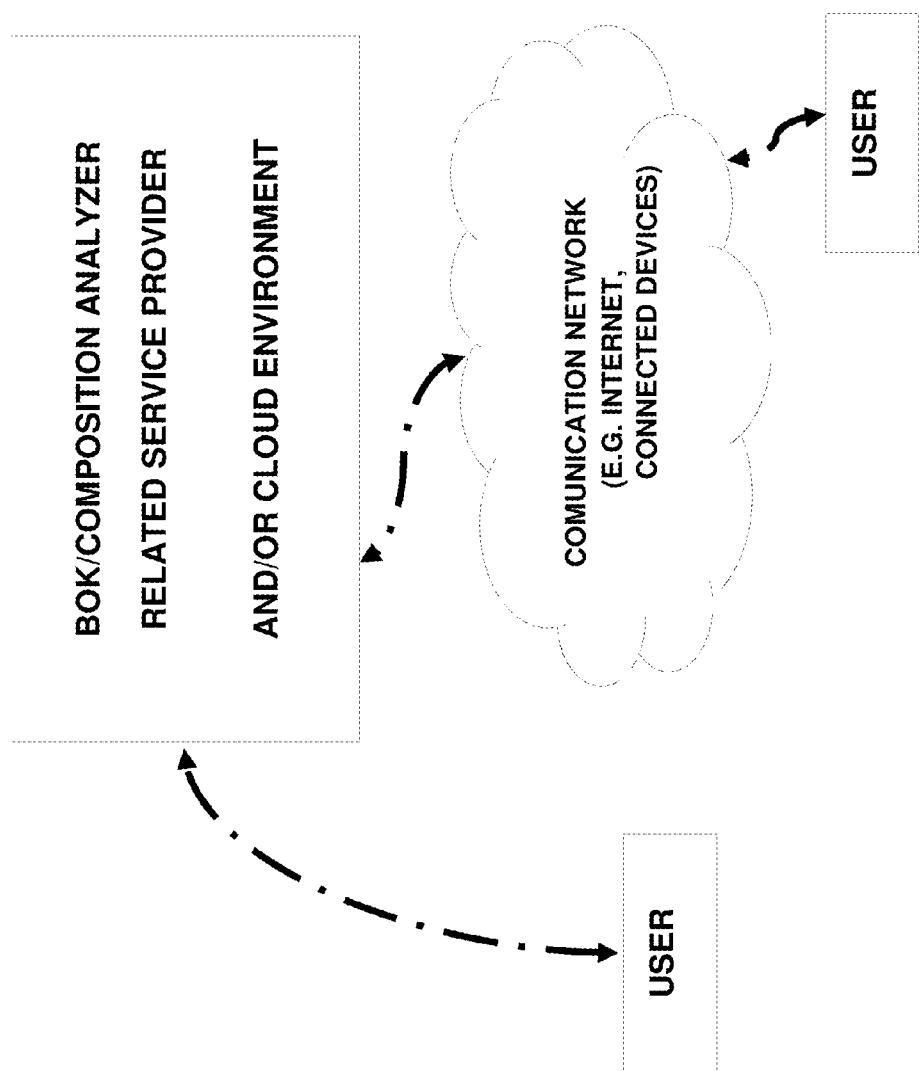
FIG. 17: An exemplary system of using the investigator providing various services to the clients in a private or public cloud environment according to one embodiment of the present invention.

FIG. 17, further exemplifies and illustrates an embodiment of a system of composition investigation that one or more client are connected to the system directly and one or more clients can optionally be connected to the system through other means of communications such as private or public data network such as wireless networks or internet. In this instance the whole system can be a private system providing such services to its user or the system is composed of several hardware and necessary software modules over a private network wherein the users can use the services of composition investigation by the system directly or over the network. Such a system can in one configuration being characterized as a private cloud computing facilities capable of interacting with clients and running the one or more of the process and algorithms and/or implement and execute one or more of the relational value significance calculations processes or implementation of one or more of the formulas or equivalent process in their software module/s to provide data/content and/or a desirable service of composition investigation to one or more client.

Figure 18:
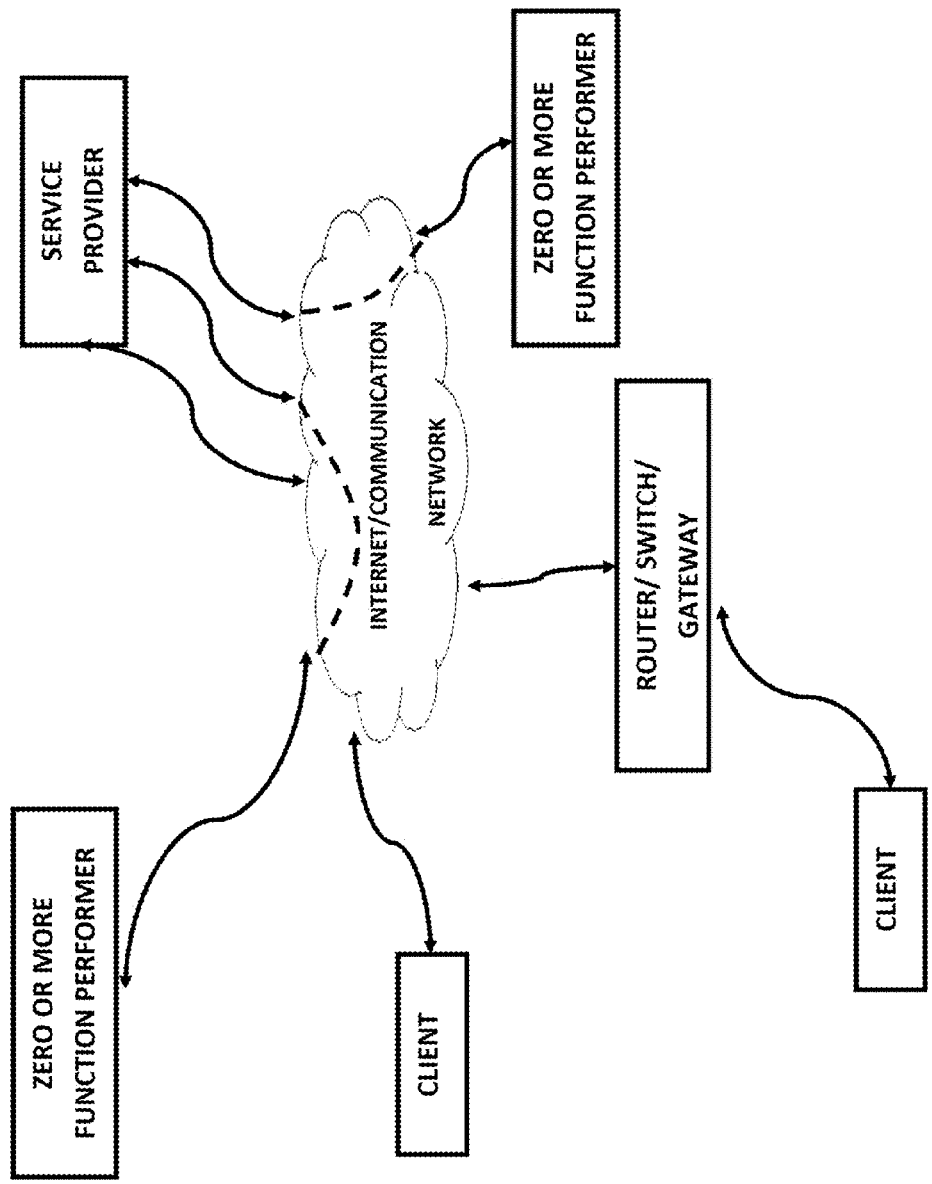
FIG. 18: another exemplary block diagram of a system of providing the various ubiquities service to one or more clients over a network wherein the system can be either localized or distributed according to one embodiment of the present invention.

FIG. 18, shows another exemplary instance of ubiquities system and service provider in which the system can/might be a distributed system and is using resources from different locations in order to perform and provide one or more of the services. One or more of the function performs as shown in FIG. 17, might be physically located across a distributed network. For instance one or more of the calculations, or one or more of the servers, the front end server, or the client's computer or device can be located in different places and still the services is performed over a distributed network. In this configuration an ISP who is facilitating the connection for a client to such a distributed network is regarded as the service provider of such service. Therefore a facilitator that facilitated (e.g. through a switch, router or a gateway etc.) at least some of the request or response data either from the client or from any part of such a distributed service is regarded as instance of such a service provider system.

An interesting mode of service is when for an input composition and after investigation the system yet provides further related compositions or bodies of knowledge to be looked at or being investigated further in relation to the one or more aspect of the input composition investigation. Another service mode is that the system provides various investigation diagnostic services for the input composition from user.

Furthermore the method and the associated system can be used as a platform so that the user can use the core algorithms of the composition investigation to build other applications that need or use the service of such investigation. For instance a client might want to have her/her website being investigated to find out the important aspects of the feedback given by their own users, visitors or clients.

In another application one can use the service to improve or create content after a through investigation of literature.

In another instance the methods and systems of the present invention can be employed to provide a human computer conversation and/or computer/computer conversation such as chat-bots, automatic customer care, question answering, fortunetelling, consulting or any general any type of kind of conversation.

In another mode a user might want to use the service of the such system and platform to compare and investigate her/his created content to find out the most closely related content available in one or more of such content repositories (e.g. a private or public, or subscribed library or knowledge database etc.) or to find out the score of her/his creation in comparison to the other similar or related content. Or to find out the valuable parts of her/his creation, or find a novel part etc.

As seen there could be envisioned numerous instance of use and applications of such process and methods of investigating that can be implemented and utilized by those of skilled in the art without departing from the scope and sprit of the present invention.

Summary

In summary, the disclosed frame work along with the algorithms and methods enables the people in various disciplines, such as artificial intelligence, robotics, information retrieval, search engines, fast and accurate machine learning, knowledge discovery, genomics and computational genomics, signal and image processing, information and data processing, autonomous decision making and navigations, encryption and compression, business intelligence, decision support systems, financial analysis, market analysis, public relation analysis, and generally any field of science and technology to use the disclosed method/s of the investigation of the compositions of ontological subjects and the bodies of knowledge to arrive the desired form of information and knowledge desired with ease, efficiency, and accuracy.

The invention provides a unified and integrated method and systems for investigation of compositions of ontological subjects. The method is language independent and grammar free. The methods do not depend on the semantic and syntactic roles of symbols, words, or in general the syntactic role of the ontological subjects of the composition to function. This will make the method very process efficient, applicable to all types of compositions and languages, and very effective in finding valuable pieces of knowledge embodied in the compositions. Several valuable applications and services also were exemplified to demonstrate the possible implementation and the possible applications and services. These exemplified applications and services were given for illustration and exemplifications only and should not be construed as limiting application. The invention has broad implication and application in many disciplines that were not mentioned or exemplified herein but in light of the present invention's concepts, algorithms, methods and teaching, they becomes apparent applications with their corresponding systems to those familiar with the art.

Among the many implications and application, the system and method have numerous applications in knowledge discovery, knowledge visualization, content creation, signal, image, and video processing, machine learning, deep learning, genomics and computational genomics and gene discovery, finding the best piece of knowledge, related to a request for knowledge, from one or more compositions, artificial intelligence, computer vision, computer conversation, approximate reasoning, as well as many other fields of science and generally ontological subject processing. The invention can serve knowledge seekers, knowledge creators, inventors, discoverer, as well as general public to investigate and obtain highly valuable knowledge and contents related to their subjects of interests. The method and system, thereby, is instrumental in increasing the speed and efficiency of knowledge retrieval, discovery, creation, learning, problem solving, and accelerating the rate of knowledge discovery to name a few.

It is understood that the preferred or exemplary embodiments, the applications, and examples described herein are given to illustrate the principles of the invention and should not be construed as limiting its scope. Those familiar with the art can yet envision, alter, and use the methods and systems of this invention in various situations and for many other applications. Various modifications to the specific embodiments could be introduced by those skilled in the art without departing from the scope and spirit of the invention as set forth in the following claims.

What is claimed is:

1. A computer system for generating and providing one or more data structures corresponding to indirect association strengths of ontological subjects of a composition comprising:

one or more data processing or computing devices having a singular or compound processing speed of one thousand million or larger than one thousand million instructions per second, a first hardware data storage, comprising one or more non-transitory storage devices, storing data of association strengths of ontological subjects of a composition by having executed a method comprising:

one or more data structures corresponding to co-occurrences of a plurality of ontological subjects of the composition within predefined proximities in the composition, building one or more data structures using data of said one or more data structures corresponding to said co-occurrences, corresponding to association strength spectrum vectors for a plurality of ontological subjects of the composition according to at least one association strength measure, wherein each association spectrum vector indicates association strength between one of the ontological subjects of the composition with one or more ontological subjects of the composition, storing said one or more data structures corresponding to said association strength spectrums in said first hardware data storage, a second hardware data storage, comprising one or more non-transitory storage devices, storing data of indirect association strengths of ontological subjects of a composition by:

calculating, using one or more data processing or computing devices and said hardware data storage storing data of association strengths of ontological subjects of the composition, an indirect association strength value between a pair of ontological subjects as a function of the association strength spectrum vectors and invert of their co-occurrence number of the pair of ontological subjects, and generating one or more data structures corresponding to the indirect association strengths of a plurality of ontological subjects of the composition and storing the generated data structures corresponding to the indirect association strengths in said second hardware data storage.

2. The computer system of claim 1, wherein the composition of ontological subject contains one or more of:

a. one or more news content,
b. a picture,
c. a video,
d. a DNA string code,
e. a graph and/or a data array representative a graph,
f. a computer readable code,
g. a multimedia content,
h. a textual content,
i. a binary string,
j. a digital signal,
k. an electrical signal,
l. a data file,
m. one or more web pages,
n. a given corpus, and
o. a body of knowledge.

3. The computer system of claim 1 wherein the indirect association strength value is used to suggest a research topic.

4. The computer system of claim 1, further comprising using the data of association strength spectrum vectors or the indirect association strength value to do at least one of followings:

a. identifying or finding related ontological subjects;
b. identifying or finding most important subjects related to another ontological subject,
c. identifying or finding indirect or novel relation of two or more ontological subjects,
d. composing a question,
e. calling a function,
f. anomaly detection,
g. composing a relevant composition to one or more ontological subjects, and
h. scoring partitions of the composition.

5. The computer system of claim 1 wherein the data of association strength spectrum vectors or the indirect association strength value is used to build a neural network with weight between nodes based on the association strength of ontological subjects.

6. The computer system of claim 1 wherein the data of association strength spectrum vectors or the indirect association strength value is used to visually or graphically show the relations of ontological subjects of the composition with a visual shape wherein the shape is built using a function of association strengths of the ontological subjects of the composition.

7. The computer system of claim 1 further comprising data communication devices/units to send and receive one or more of said data structures.

8. The computer system of claim 1 wherein the first and the second hardware data storage using same one or more non-transitory storage devices.

9. The computer system of claim 1 wherein the computer system is distributed and at least one part of the computer system is physically located in a different place than the rest of the computer system.

* * * * *